United States Patent
Kim et al.

(10) Patent No.: US 10,469,225 B2
(45) Date of Patent: Nov. 5, 2019

(54) METHOD FOR TRANSMITTING AND RECEIVING DEMODULATION REFERENCE SIGNAL, AND APPARATUS USING SAME

(71) Applicant: LG ELECTRONICS INC., Seoul (KR)

(72) Inventors: Kijun Kim, Seoul (KR); Hyungtae Kim, Seoul (KR); Jonghyun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/759,624

(22) PCT Filed: Sep. 7, 2016

(86) PCT No.: PCT/KR2016/010006
§ 371 (c)(1),
(2) Date: Mar. 13, 2018

(87) PCT Pub. No.: WO2017/047971
PCT Pub. Date: Mar. 23, 2017

(65) Prior Publication Data
US 2018/0254867 A1    Sep. 6, 2018

Related U.S. Application Data

(60) Provisional application No. 62/217,980, filed on Sep. 14, 2015, provisional application No. 62/236,146, filed on Oct. 2, 2015.

(51) Int. Cl.
*H04L 5/00* (2006.01)
*H04B 7/0452* (2017.01)

(52) U.S. Cl.
CPC ......... *H04L 5/0048* (2013.01); *H04B 7/0452* (2013.01); *H04L 5/0023* (2013.01); *H04L 5/0051* (2013.01)

(58) Field of Classification Search
CPC . H04L 5/0048; H04B 7/0452; H04W 13/0048
See application file for complete search history.

(56) References Cited

U.S. PATENT DOCUMENTS

2011/0228735 A1    9/2011  Lee et al.
2011/0310825 A1*  12/2011  Hu ........................ H04L 5/0017
                                                    370/329

(Continued)

OTHER PUBLICATIONS

Catt, "DMRS Design for High-order MU-MIMO," 3GPP TSG RAN WG1 Meeting #82, R1-153937, Beijing, China, Aug. 24-28, 2015, 2 pages.

(Continued)

*Primary Examiner* — Kevin C. Harper
(74) *Attorney, Agent, or Firm* — Birch, Stewart, Kolasch & Birch, LLP

(57) ABSTRACT

The present invention relates to a wireless communication system, and specifically provides a method for transmitting and receiving a demodulation reference signal (DMRS), and an apparatus using the same. More specifically, the present invention provides a method for transmitting and receiving a DMRS and an apparatus using the same, wherein a base station allocates a Walsh sequence for each antenna port to the DMRS for each antenna port using a method that is different from conventional methods, and thereby increases the number of user equipment that are MU-MIMO paired compared to the past, and can satisfy orthogonality between four DMRS sequences in both time and frequency domains so that user equipment receiving the DMRS can efficiently estimate a channel.

8 Claims, 19 Drawing Sheets

(56) References Cited

U.S. PATENT DOCUMENTS

2011/0310838 A1     12/2011  Zheng et al.
2012/0051209 A1*    3/2012   Sun .................... H04J 13/18
                                                    370/208
2014/0133395 A1*    5/2014   Nam ................... H04B 7/0452
                                                    370/328

OTHER PUBLICATIONS

Nokia Networks, "DMRS Enhancements for FD-MIMO," 3GPP TSG RAN WG1 Meeting #82, R1-154519, Beijing, China, Aug. 24-28, 2015, 5 pages.

Samsung, "Discussion on DMRS Enhancement for FD-MIMO," 3GPP TSG RAN WG1 Meeting #82, R1-154166, Beijing, China, Aug. 24-28, 2015, 2 pages.

* cited by examiner (a)

(b)

METHOD FOR TRANSMITTING AND RECEIVING DEMODULATION REFERENCE SIGNAL, AND APPARATUS USING SAME

CROSS REFERENCE TO RELATED APPLICATIONS

This application is the National Phase of PCT International Application No. PCT/KR2016/010006, filed on Sep. 7, 2016, which claims priority under 35 U.S.C. 119(e) to U.S. Provisional Application No. 62/217,980, filed on Sep. 14, 2015 and 62/236,146, filed on Oct. 2, 2015, all of which are hereby expressly incorporated by reference into the present application.

TECHNICAL FIELD

Following description relates to a wireless communication system, and more particularly, to a method of transmitting and receiving a DMRS (demodulation reference signal) and an apparatus using the same.

BACKGROUND ART

Wireless communication systems are widely deployed to provide various kinds of communication services such as voice and data services. Generally, these communication systems are multiple access systems capable of supporting communication with multiple users by sharing available system resources (e.g., bandwidth and transmit power). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency-division multiple access (SC-FDMA) system, and a multi-carrier frequency division multiple access (MC-FDMA) system.

DISCLOSURE OF THE INVENTION

Technical Tasks

The present invention proposes a method for a base station to increase the number of orthogonal DMRSs capable of being allocated between MU-MIMO UEs up to maximum 4 to perform MU-MIMO (multi user-multi input multi output) transmission.

In particular, when DMRS overhead per resource block (RB) corresponds to 12 resource elements (REs) and data is transmitted via maximum 4 layers, the present invention proposes a method for a base station to solve a transmit power imbalance problem according to an OFDM (orthogonal frequency division multiplexing) symbol in which a DMRS is transmitted.

And, the present invention proposes a method of transmitting and receiving a DMRS satisfying both orthogonality in a time axis and orthogonality in a frequency axis among 4 DMRS sequences to efficiently estimate a channel in a time-selective channel and a frequency-selective channel.

It is to be understood that technical objects to be achieved by the present invention are not limited to the aforementioned technical object and other technical objects which are not mentioned herein will be apparent from the following description to one of ordinary skill in the art to which the present invention pertains.

Technical Solution

To achieve these and other advantages and in accordance with the purpose of the present invention, as embodied and broadly described, according to one embodiment, a method of transmitting a demodulation reference signal, which is transmitted by a base station in a wireless communication system, includes the steps of allocating one selected from a group consisting of an antenna port #7, #8, #11, and #13 to each of a plurality of user equipments (UEs), respectively, acquiring a modulation reference signal DMRSp of an antenna port p by mapping a Walsh sequence Wp corresponding to the antenna port p to a reference signal sequence, and transmitting the DMRSp to a corresponding UE among the plurality of the UEs through the antenna port p in a first PRB (physical resource block). In this case, the Walsh sequence Wp=[a b c d] is mapped to the reference signal sequence in a time direction and is mapped to repeat an order of [a b c d] pattern, [d c b a] pattern, [b a d c] pattern, and [c d a b] pattern along a frequency direction. The plurality of the UEs may correspond to maximum 4 UEs and the p can satisfy p∈{#7, #8, #11, #13}.

To further achieve these and other advantages and in accordance with the purpose of the present invention, according to a different embodiment, a base station transmitting a demodulation reference signal in a wireless communication system includes a transmission module and a processor configured to control the transmission module, the processor configured to allocate one selected from a plurality of antenna ports comprising an antenna port #7, #8, #11, and #13 to each of a plurality of user equipments (Us), respectively, the processor configured to acquire a modulation reference signal DMRSp of an antenna port p by mapping a Walsh sequence Wp corresponding to the antenna port p to a reference signal sequence, the processor configured to transmit the DMRSp to a corresponding UE among the plurality of the UEs through the antenna port p in a first PRB (physical resource block). In this case, the Walsh sequence Wp=[a b c d] is mapped to the reference signal sequence in a time direction and is mapped to repeat an order of [a b c d] pattern, [d c b a] pattern, [b a d c] pattern, and [c d a b] pattern along a frequency direction. The plurality of the UEs may correspond to maximum 4 UEs and the p can satisfy p∈{#7, #8, #11, #13}.

In this case, in each of the embodiments, when a legacy UE is included in the plurality of the UEs, the antenna port #7 can be allocated to the legacy UE.

In each of the embodiments, an each element value of the Walsh sequence Wp=[a b c d] can be determined based on a Table 1 described in the following.

TABLE 1

| Antenna port p | [a b c d] |
|---|---|
| #7 | [+1 +1 +1 +1] |
| #8 | [+1 −1 +1 −1] |
| #11 | [+1 +1 −1 −1] |
| #13 | [+1 −1 −1 +1] |

In each of the embodiments, the method can further include the step of transmitting the DMRSp to maximum 2 UEs among a plurality of the UEs through the antenna port p in a second PRB set. In this case, the Walsh sequence Wp=[a b c d] is mapped to the reference signal sequence in a time direction in the second PRB set and can be mapped to repeat an order of [a b c d] pattern and [d c b a] pattern along a frequency direction.

To further achieve these and other advantages and in accordance with the purpose of the present invention, according to a further different embodiment, a method of receiving a demodulation reference signal, which is received by a user equipment (UE) in a wireless communication system, includes the steps of receiving antenna port allocation information indicating one selected from a group comprising an antenna port #7, #8, #11, and #13 and receiving a DMRS based on a Walsh sequence corresponding to an allocated antenna port. In this case, a Walsh sequence [a b c d] corresponding to the allocated antenna port is mapped in a time direction and can be mapped to repeat an order of [a b c d] pattern, [d c b a] pattern, [b a d c] pattern, and [c d a b] pattern along a frequency direction.

To further achieve these and other advantages and in accordance with the purpose of the present invention, according to a further different embodiment, a user equipment receiving a DMRS (demodulation reference signal) in a wireless communication system includes a reception module and a processor configured to control the reception module, the processor configured to receive antenna port allocation information indicating one selected from a group comprising an antenna port #7, #8, #11, and #1, the processor configured to receive a DMRS based on a Walsh sequence corresponding to an allocated antenna port. In this case, a Walsh sequence [a b c d] corresponding to the allocated antenna port is mapped in a time direction and is mapped to repeat an order of [a b c d] pattern, [d c b a] pattern, [b a d c] pattern, and [c d a b] pattern along a frequency direction.

In each of the embodiments, blind decoding is performed to determine whether or not a demodulation reference signal is transmitted through the allocated antenna port and one or more different antenna ports, an antenna port on which the blind decoding is performed by the UE is determined based on a Table 2 described in the following according to an antenna port allocated to the UE.

TABLE 2

| Allocated antenna port | Antenna ports on which blind decoding is performed |
|---|---|
| #7 | #8, #8', #11, #13 |
| #8 | #7, #11, #13 |
| #11 | #7, #8, #13 |
| #13 | #7, #8, #11 | and, an antenna port #8' of the Table 2 can indicate an antenna port where a Walsh sequence [e f g h] corresponding to an antenna port #8 is mapped to repeat an order of [e f g h] pattern and [h g f e] pattern to transmit a modulation reference signal.

In each of the embodiments, an each element value of a Walsh sequence according to an antenna port can be determined based on a Table 3 described in the following.

TABLE 3

| Antenna port p | [a b c d] |
|---|---|
| #7 | [+1 +1 +1 +1] |
| #8 | [+1 −1 +1 −1] |
| #11 | [+1 +1 −1 −1] |
| #13 | [+1 −1 −1 +1] |

Advantageous Effects

According to a DMRS proposed in the present invention, it is able to uniformly distribute power of a signal, which is transmitted according to an OFDM symbol in which the DMRS is transmitted, according to each OFDM symbol.

According to a DMRS proposed in the present invention, it is able to guarantee orthogonality between DMRSs of 4 antenna ports even when a DMRS is inversely spread in time axis direction and frequency axis direction.

It will be appreciated by those skilled in the art that the effects that can be achieved with the present invention are not limited to what has been described above and other advantages of the present invention will be clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

BEST MODE

Mode for Invention

Figure 1:
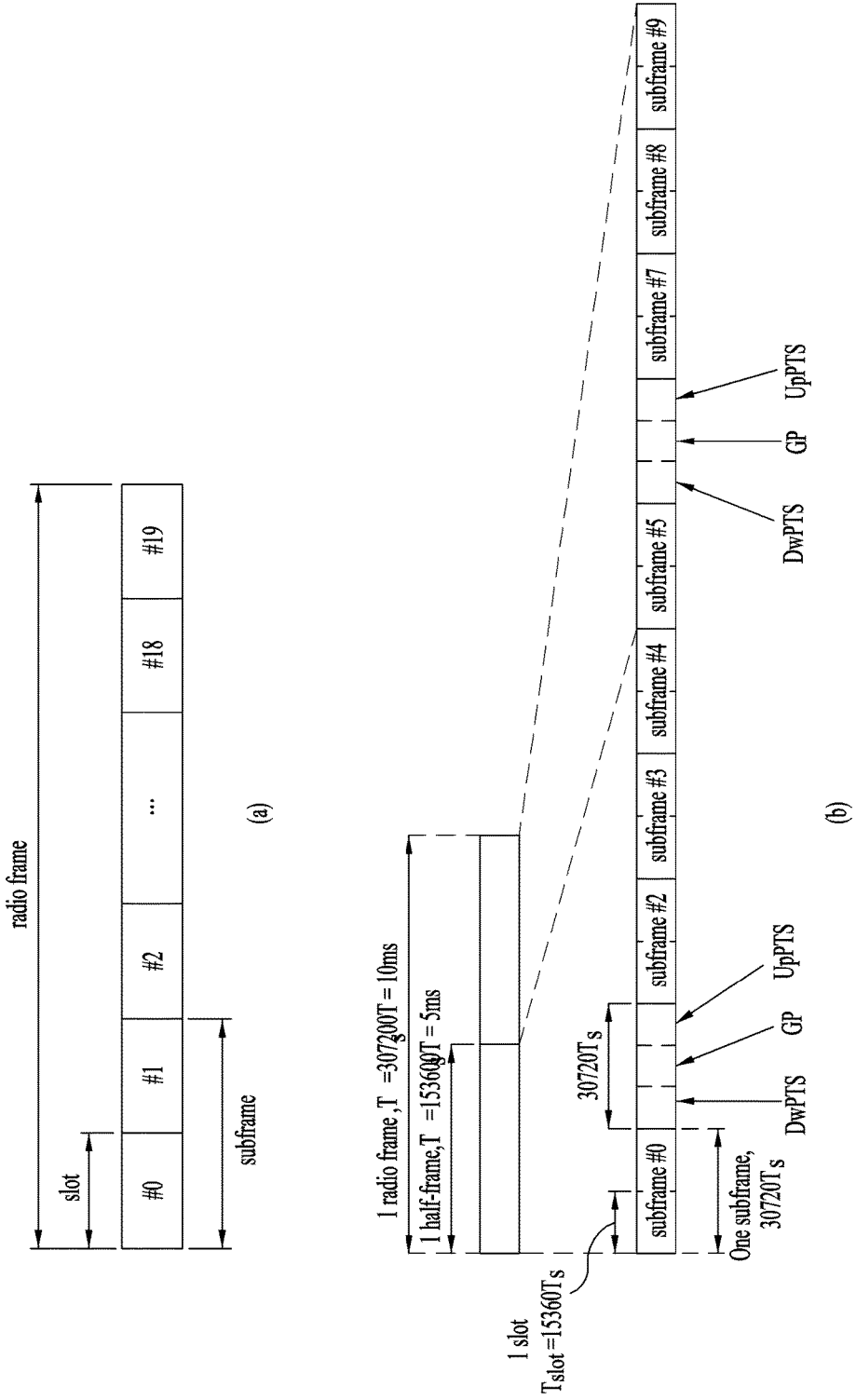
FIG. 1 illustrates a radio frame structure.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE'. 'Mobile Station (MS)', 'Mobile Subscriber Station (MSS)', 'Subscriber Station (SS)', etc.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/Channel

Hereinafter, the structure of a radio frame will be described with reference to FIG. 1.

In a cellular Orthogonal Frequency Division Multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CR Thus when the extended CP is used, for example, 6 OFDM symbols may be included in one slot. If channel state gets poor, for example, during fast movement of a HE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
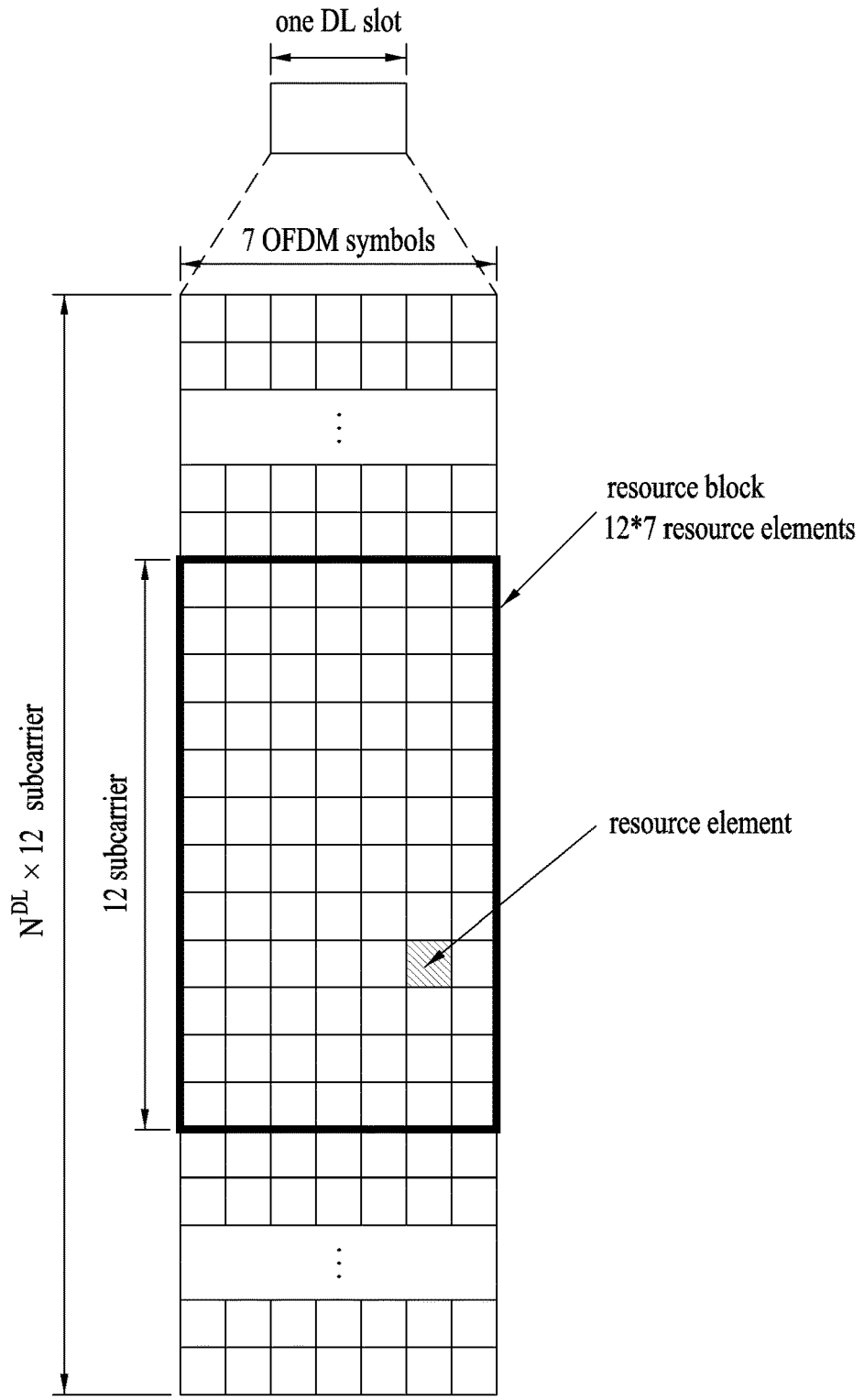
FIG. 2 is a diagram illustrating a resource grid for one downlink (DL) slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
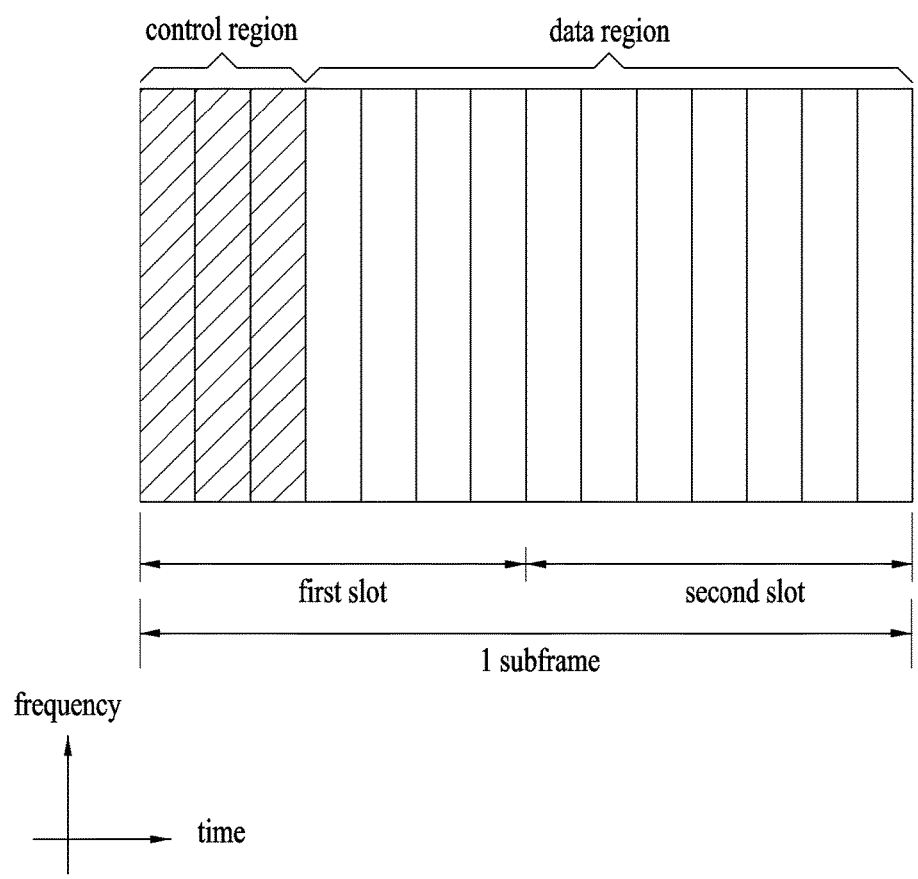
FIG. 3 is a diagram illustrating a DL subframe structure.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
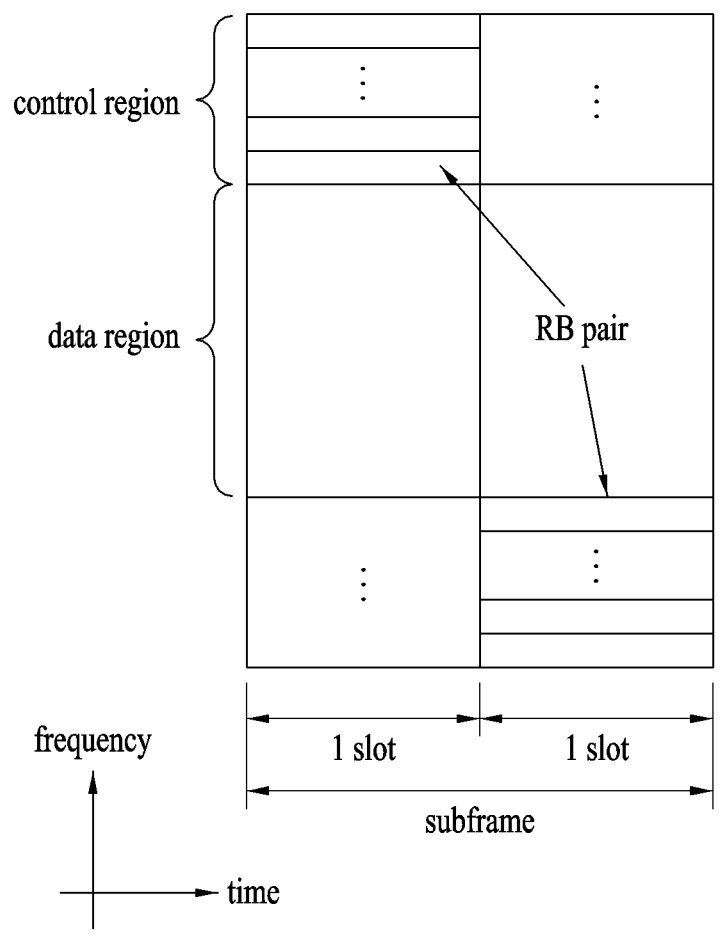
FIG. 4 is a diagram illustrating an uplink (UL) subframe structure.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signal (RS)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between Transmission (Tx) antennas and Reception (Rx) antennas is required for successful signal reception. Accordingly, an RS should be transmitted through each Tx antenna.

RSs may be divided into downlink RSs and uplink RSs. In the current lll system, the uplink RSs include:

i) DeModulation-Reference Signal (DM-RS) used for channel estimation for coherent demodulation of information delivered on a PUSCH and a PUCCH; and ii) Sounding Reference Signal (SRS) used for an eNB or a network to measure the quality of an uplink channel in a different frequency.

The downlink RSs are categorized into:

i) Cell-specific Reference Signal (CRS) shared among all UEs of a cell:

ii) UE-specific RS dedicated to a specific UE;

iii) DM-RS used for coherent demodulation of a PDSCH, when the PDSCH is transmitted;

iv) Channel State Information-Reference Signal (CSI-RS) carrying CSI, when downlink DM-RSs are transmitted;

v) Multimedia Broadcast Single Frequency Network (MBSFN) RS used for coherent demodulation of a signal transmitted in MBSFN mode; and vi) positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

CRSs serve two purposes, that is, channel information acquisition and data demodulation. A UE-specific RS is used only for data demodulation. CRSs are transmitted in every subframe in a broad band and CRSs for up to four antenna ports are transmitted according to the number of Tx antennas in an eNB.

For example, if the eNB has two Tx antennas, CRSs for antenna ports 0 and 1 are transmitted. In the case of four Tx antennas, CRSs for antenna ports 0 to 3 are respectively transmitted.

Figure 5:
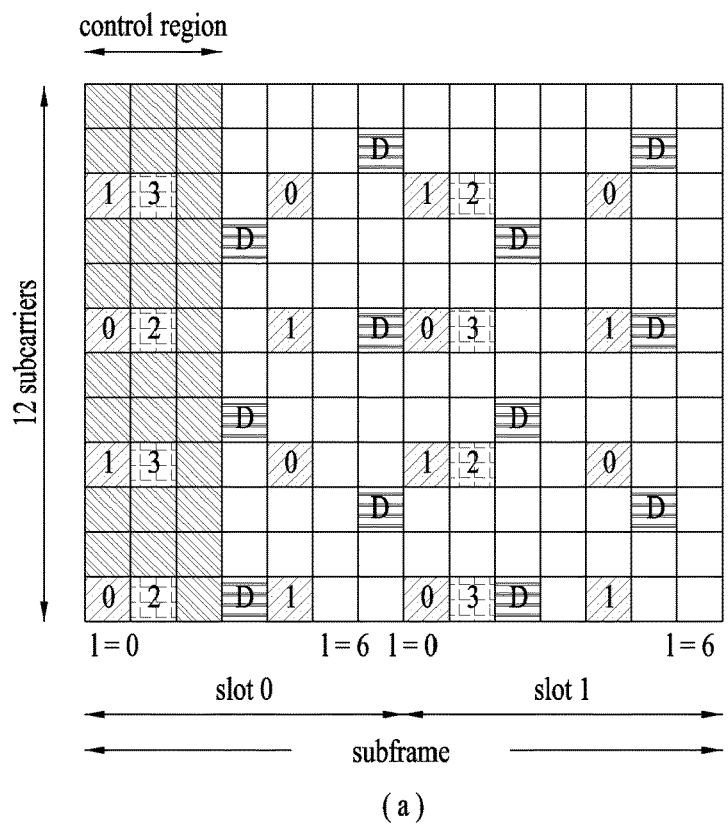
FIG. 5 illustrates a reference signal.
Figure 5:
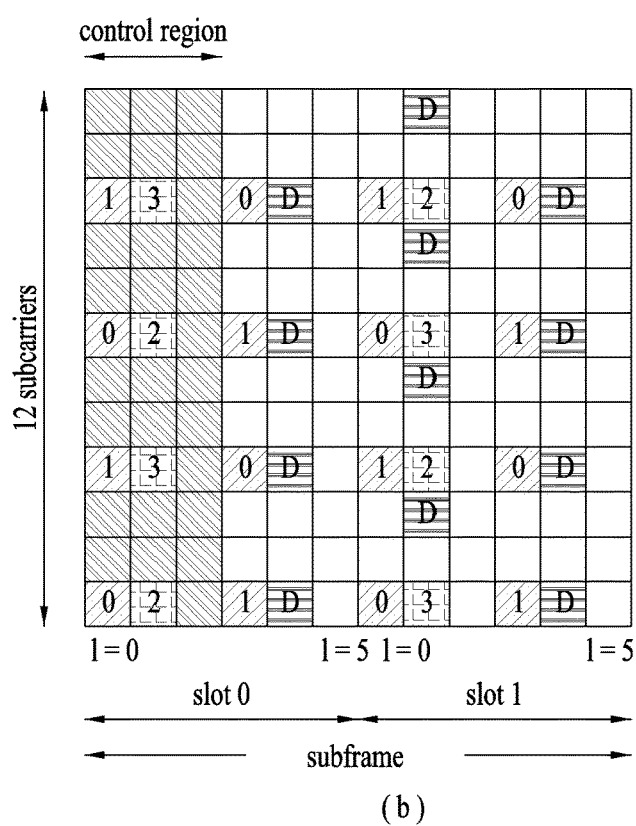

FIG. 5 illustrates patterns in which CRSs and DRSs are mapped to a downlink RB pair, as defined in a legacy 3GPP LTE system (e.g. conforming to Release-8). An RS mapping unit, i.e. a downlink RB pair may include one subframe in time by 12 subcarriers in frequency. That is, an RB pair includes 14 OFDM symbols in time in the case of the normal CP (see FIG. 5(*a*)) and 12 OFDM symbols in time in the case of the extended CP (see FIG. 5(*b*)).

In FIG. 5, the positions of RSs in an RB pair for a system where an eNB supports four Tx antennas are illustrated. Reference numerals 0, 1, 2 and 3 denote the REs of CRSs for first to fourth antenna ports, antenna port 0 to antenna port 3, respectively, and reference character 'D' denotes the positions of DRSs.

Demodulation Reference Signal (DMRS)

DMRS is a reference signal defined to allow a UE to perform channel estimation for a PDSCH. The DMRS may be used in transmission modes 7, 8 and 9. The DMRS was initially defined for single layer transmission on antenna port 5. Over time, the definition has expanded to cover spatial multiplexing of up to eight layers. As the term "UE-specific RS", which is another name of the DMRS, suggests, the DMRS is transmitted only for a single specific UE, and accordingly it may be transmitted only on RBs on which a PDSCH for the specific UE is transmitted.

Figure 6:
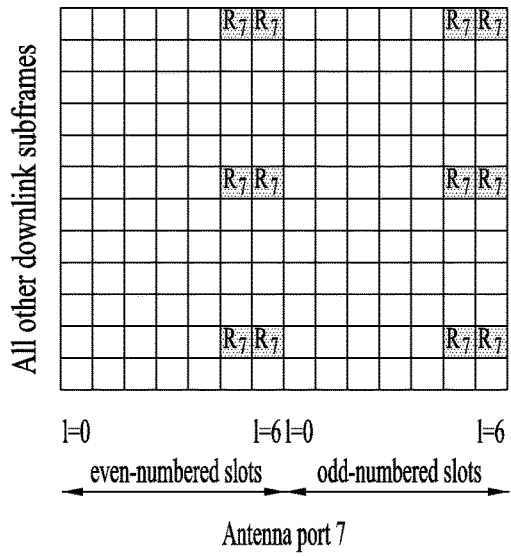
FIG. 6 illustrates a demodulation reference signal (DMRS)
Figure 6:
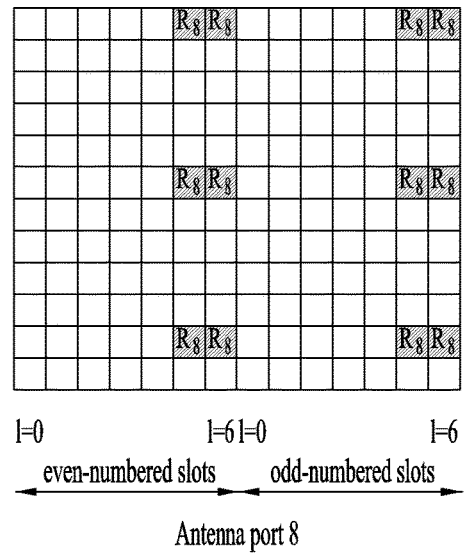
Figure 6:
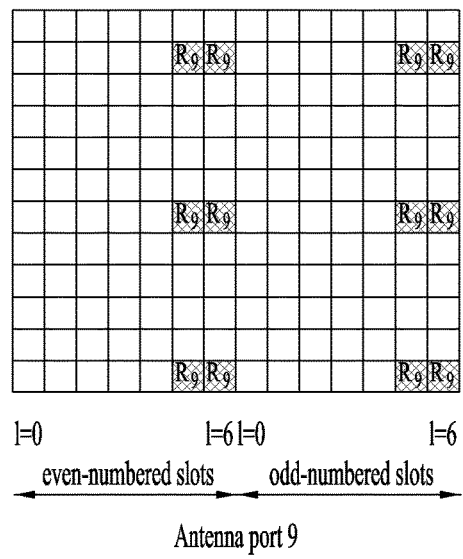
Figure 6:
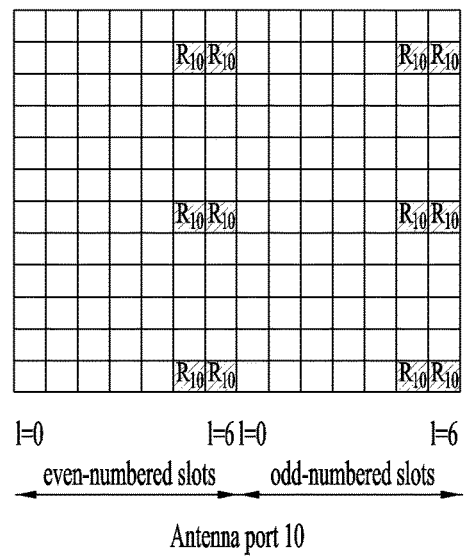

Hereinafter, description will be given of generation of a DMRS for up to eight layers. The DMRS may be transmitted with a reference-signal sequence r(m), which is generated according to Equation 1 given below, mapped to complex-valued modulation symbols $a_{k,l}^{(p)}$, which are generated according to Equation 2 given below. FIG. 6 illustrates antenna ports 7 to 1 with the DMRS mapped to a resource grid in subframes according to Equation 2 in the case of a normal CP.

$$r(m) = \frac{1}{\sqrt{2}}(1 - 2 \cdot c(2m)) + j\frac{1}{\sqrt{2}}(1 - 2 \cdot c(2m+1)), \quad \text{[Equation 1]}$$

$$m = \begin{cases} 0, 1, \ldots, 12N_{RB}^{max,DL} - 1 & \text{normal cyclic prefix} \\ 0, 1, \ldots, 16N_{RB}^{max,DL} - 1 & \text{extended cyclic prefix} \end{cases}$$

Herein, r(m) denotes a reference-signal sequence, c(i) denotes a pseudo-random sequence, and $N_{RB}^{max,DL}$ denotes a maximum number of RBs of a downlink bandwidth.

$$a_{k,l}^{(p)} = w_p(l') \cdot r(3 \cdot l' \cdot N_{RB}^{max,DL} + 3 \cdot n_{PRB} + m') \quad \text{[Equation 2]}$$

where $$w_p(i) = \begin{cases} \bar{w}_p(i) & (m' + n_{PRB}) \bmod 2 = 0 \\ \bar{w}_p(3-i) & (m' + n_{PRB}) \bmod 2 = 1 \end{cases}$$

$$k = 5m' + N_{sc}^{RB} n_{PRB} + k'$$

$$k' = \begin{cases} 1 & p \in \{7, 8, 11, 13\} \\ 0 & p \in \{9, 10, 12, 14\} \end{cases}$$

$$l = \begin{cases} l' \bmod 2 + 2 & \text{if in a special subframe with configuration 3, 4, 8 or 9} \\ l' \bmod 2 + 2 + 3\lfloor l'/2 \rfloor & \text{if in a special subframe with configuration 1, 2, 6, or 7} \\ l' \bmod 2 + 5 & \text{if not in a special subframe} \end{cases}$$

$$l' = \begin{cases} 0, 1, 2, 3 & \text{if } n_s \bmod 2 = 0 \text{ and in a special subframe with configuration 1, 2, 6, or 7} \\ 0, 1 & \text{if } n_s \bmod 2 = 0 \text{ and not in special subframe with configuration 1, 2, 6, or 7} \\ 2, 3 & \text{if } n_s \bmod 2 = 1 \text{ and not in special subframe with configuration 1, 2, 6, or 7} \end{cases}$$

$$m' = 0, 1, 2$$

As can be seen from Equation 2, when a reference-signal sequence is mapped to complex demodulation symbols, an orthogonal sequence $\bar{w}_p(i)$ shown in Table 1 below is applied according to antenna ports.

TABLE 1

| Antenna port p | $[\bar{w}_p(0)\ \bar{w}_p(1)\ \bar{w}_p(2)\ \bar{w}_p(3)]$ |
|---|---|
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

The DMRSs may perform channel estimation using different methods according to the spreading factor (2 or 4).

Referring to Table 1, the spreading factor for antenna ports 7 to 10 is 2 since the orthogonal sequences for the antenna ports are repeated in the pattern of [a b a b]. The spreading factor for antenna ports 11 to 14 is 4. When the spreading factor is 2, a UE may perform channel estimation by de-spreading the DMRS of the first slot and the DMRS of the second slot respectively using the spreading factor of 2 and then performing time interpolation. When the spreading factor is 4, channel estimation may be performed by de-spreading the DMRSs in all subframes simultaneously using the spreading factor of 4.

When the spreading factor is 2, channel estimation according to the spreading factor may obtain a gain by applying time interpolation in high mobility situations and a gain in decoding time according to de-spreading allowed for the DMRS of the first slot. When the spreading factor of 4 is used, more UEs or ranks may be supported.

Figure 7:
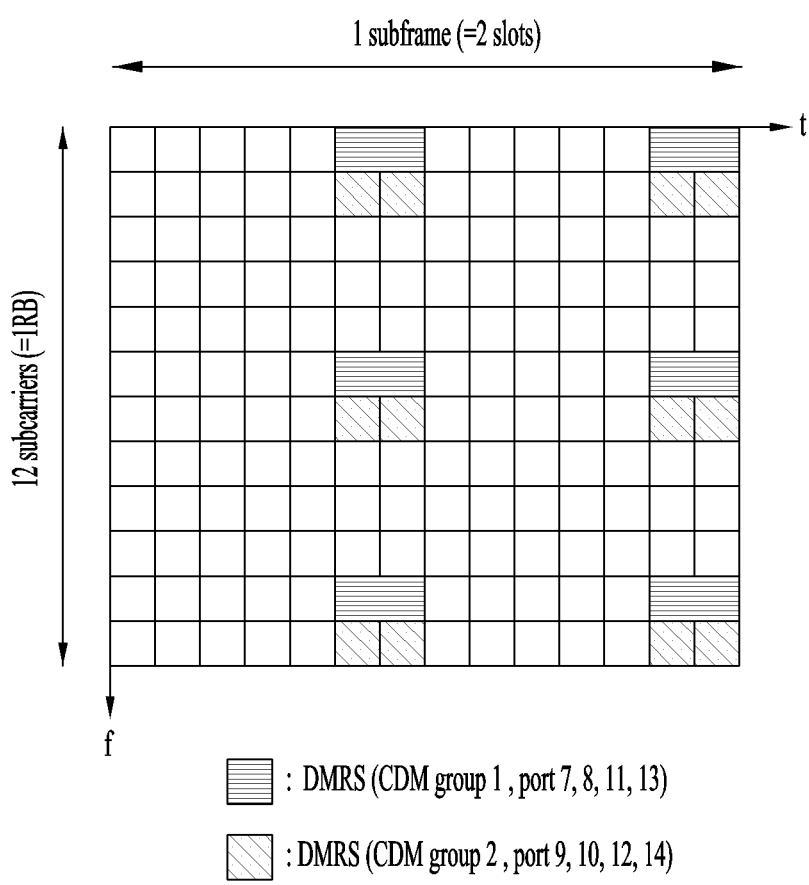
FIG. 7 is a diagram for explaining a CDM (code division multiplexing) group applied to a DMRS (demodulation reference signal)

Hereinafter, description will be given in terms of DMRS overhead with reference to FIG. 7. FIG. 7 illustrates mapping of a DMRS onto a subframe for each of antenna ports 7 to 1. As shown in FIG. 7, antenna ports may be divided into Code Divisional Multiplexing (CDM) group 1 (or a first antenna port set) and CDM group 2 (or a second antenna port set) according to locations in the resource grid to which the DMRSs are mapped. The DMRSs on antenna ports 7, 8, 11 and 13 are transmitted on REs corresponding to CDM group 1, and the DMRSs on antenna ports 9, 10, 12 and 14 are transmitted on REs corresponding to CDM group 2. In other words, the DMRSs on the antenna ports included in one CDM group are transmitted on the same REs. When only antenna ports corresponding to CDM group 1 are used to transmit DMRSs, the number of resources necessary for the DMRSs, namely the DMRS overhead, is 12. Similarly, when antenna ports corresponding to CDM group 2 are used, the DMRS overhead is 24.

PRB (Physical Resource Block) Bundling

PRB bundling (bundling) is a concept of applying the same PMI to a plurality of RBs (resource blocks) adjacent to each other when data is transmitted. An RB size to the same PMI is applied is determined according to an available frequency range.

More specifically, if PMI/RI feedback is set, a UE may assume that a precoding granularity corresponds to a plurality of RBs in frequency domain. A PRG (precoding resource block group), which is dependent of a stationary system bandwidth of a size of P', divides a system bandwidth and each PRG includes contiguous PRBs. If $N_{RB}^{DL}$ mod P' is greater than 0, one of the PRGs has a size of $N_{RB}^{DL} - P'\lfloor N_{RB}^{DL}/P' \rfloor$. A PRG size is not an ascending order in a lowest frequency. A UE may assume that the same precoder is applied to all scheduled PRBs within a PRG.

A PRG size capable of being assumed by a UE for a given system bandwidth is shown in the following.

TABLE 2

| System Bandwidth ($N_{RB}^{DL}$) | PRG Size (P') (PRBs) |
|---|---|
| ≤10 | 1 |
| 11-26 | 2 |
| 27-63 | 3 |
| 64-110 | 2 |

The present invention proposes a method of increasing the number of orthogonal DMRSs capable of being allocated between MU-MIMO (multi user-multi input multi output) UEs (user equipments) to N from 2 supported by LTE spec.

In other word, the present invention proposes a method for a UE to estimate a DMRS channel without interference between MU-MIMO UEs even when the number of MU-MIMO UEs is equal to or greater than 3. In particular, the technique proposed by the present invention can be efficiently utilized when a plurality of MU-MIMO UEs are supported in environment that the number of antennas of a base station grows exponentially due to the future 3D-MIMO technology.

Moreover, an enhanced UE can receive a DMRS to which an allocation pattern or a mapping pattern of a Walsh sequence according to an antenna port newly proposed in the present invention is applied. In this case, the enhanced UE is MU-MIMO paired with a legacy UE configured to receive a DMRS according to a legacy spec to receive data. In other word, the technique proposed in the present invention can support backward compatibility with the legacy spec as well.

According to a PDSCH transmission scheme using a DMRS of legacy LTE-A standard, up to maximum 8 layers can perform data transmission. In this case, if the v number of layers is transmitted, it may indicate that each data layer is transmitted through the v number of virtual antenna ports (APs). In order for a receiving end to demodulate data transmitted via each antenna port, a DMRS is required. Hence, a transmitting end can transmit a DMRS according to each antenna port. According to a PDSCH transmission scheme using a DMRS, if the v number of layers is transmitted, it may use antenna ports #7 to antenna port #(7+v). As mentioned earlier in 3GPP LTE standard, regarding a position of a resource element (RE) in which a DMRS of each AP is transmitted, APs 7, 8, 11, and 13 transmit a DMRS in a manner of being CDM (code division multiplexing) using the same RE position. On the other hand, APs 9, 10, 12, and 14 transmit a DMRS in a manner of being CDM at a different RE position. The abovementioned configuration can be checked via FIG. 7.

Figure 8:
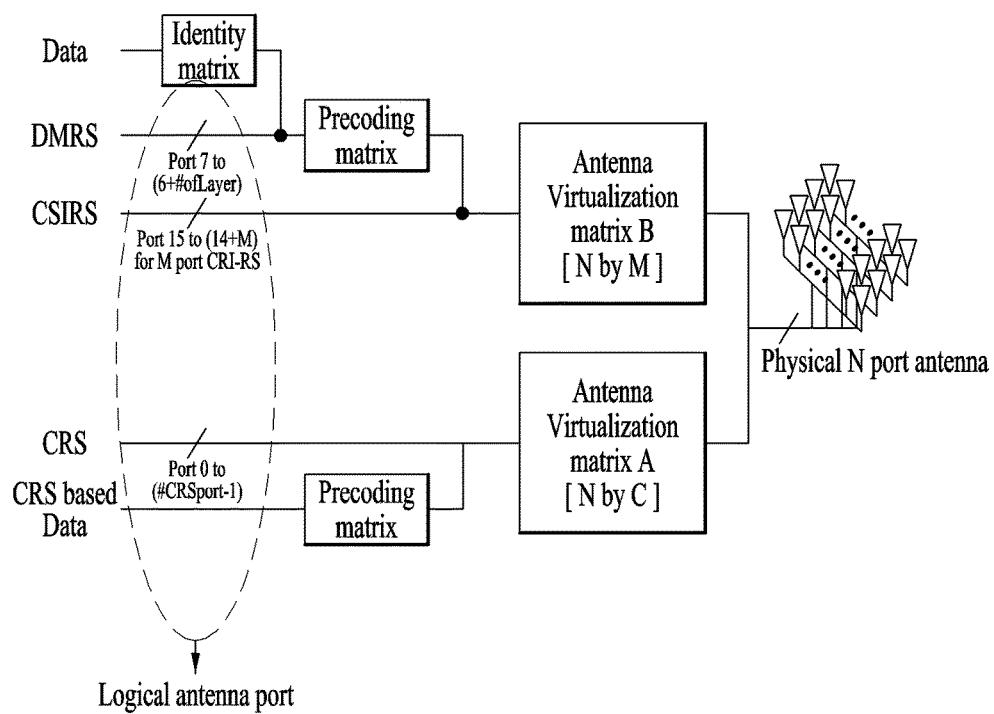
FIG. 8 is a diagram illustrating a concept of antenna virtualization.

FIG. 8 is a diagram illustrating a concept of antenna virtualization. FIG. 8 illustrates an example that a CSI-RS uses M number of antenna ports and a CRS uses C number of antenna ports. In FIG. 8, a matrix A for a CRS is identically used by all UEs via antenna virtualization for transmitting the CRS and a CRS-based modulation data. If the number of physical antenna ports is equal to or less than 8, a matrix B for a CSI-RS is used in a manner of being 1:1 mapped to the physical antenna ports. In FIG. 8, a DMRS is always beamformed using a precoding matrix and is mapped to a physical antenna port.

Figure 9:
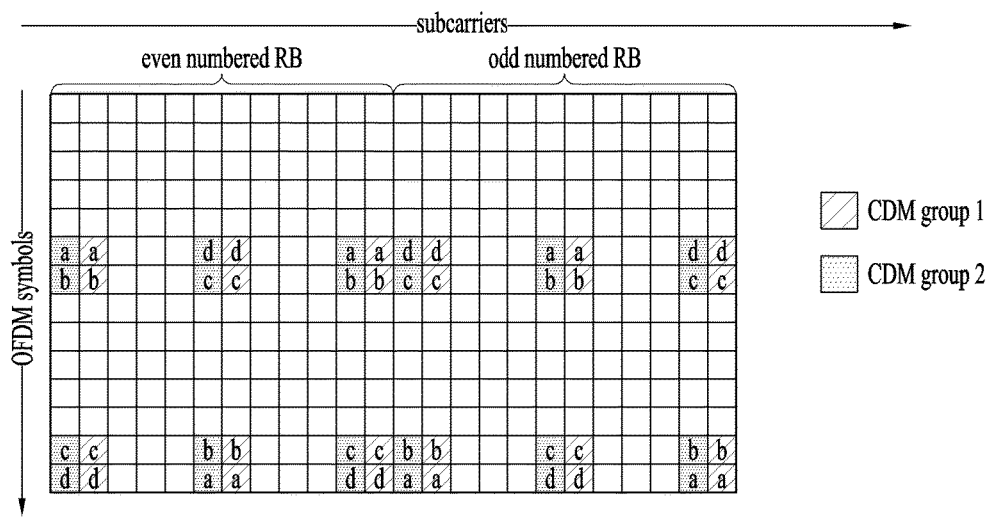
FIG. 9 is a diagram illustrating resource elements in which a DMRS is transmitted based on 8 antenna ports and an allocation pattern of an applied Walsh sequence.

FIG. 9 illustrates REs in which a DMRS is transmitted in a resource block (RB) including 12 subcarriers during a subframe (SF) of 1 ms. More specifically, FIG. 9 illustrates REs in which DMRSs of APs 7, 8, 11, and 13 are transmitted (i.e., a position of a CDM group 1) and REs in which DMRSs of APs 9, 10, 12, and 14 are transmitted (i.e., a position of a CDM group 2).

As shown in equation 2, a DMRS sequence mapped to an RE in which a DMRS is transmitted is formed by a multiplication of two components (i.e., Walsh sequence and QPSK modulated gold sequence). The QPSK modulated gold sequence has a characteristic of a pseudo-random sequence and DMRSs of all antenna ports use the same QPSK modulated gold sequence. And, the Walsh sequence uses a different orthogonal sequence according to an antenna port to make channel estimation to be performed according to an antenna port without interference. In particular, the QPSK modulated gold sequence provides quasi-orthogonality to a DMRS transmitted between cells or virtual sectors and the Walsh sequence can provide orthogonality between APs transmitted in a single virtual sector.

When a DMRS sequence is mapped to an RE in which a DMRS is transmitted, a QPSK modulated gold sequence component of the DMRS sequence is preferentially mapped along a frequency axis. In particular, a DMRS is mapped to 110 RBs (3 DMRSs per RB) from a subcarrier of a lowest index in a $6^{th}$ OFDM symbol in which a DMRS is transmitted. In particular, a DMRS is mapped to 330 REs in total. Subsequently, a DMRS is also mapped to 330 REs in total in a $7^{th}$ OFDM symbol in which a DMRS is transmitted. On the other hand, unlike the QPSK modulated gold sequence component, a Walsh sequence component of the DMRS sequence is mapped along a time axis. A Walsh sequence used according to an antenna port is shown in table 1. As shown in FIG. 9, a Walsh sequence $[\overline{w}_p(0)\ \overline{w}_p(1)\ \overline{w}_p(2)\ \overline{w}_p(3)]$ of a length 4 is allocated or mapped to an RE along the time axis. In this case, assume that each of elements included in the Walsh sequence of length 4 is represented as [a b c d]. In this case, the Walsh sequence is allocated or mapped to an RE in time axis direction in a manner of alternating [a b c d] and [d c b a] along the frequency axis direction of the RE to which a DMRS is mapped. The mapped DMRS is transmitted in an RB in which a DMRS-based PDSCH is transmitted only.

As shown in FIG. 8, the mapped DMRS is precoded and is mapped to a physical antenna port. In this case, a DMRS precoded to the CDM group 1 can be expressed as equation 4 described in the following.

$$Z = P \cdot W \cdot r(n) = P \cdot \begin{bmatrix} \overline{w}_7(l) \\ \overline{w}_8(l) \\ \overline{w}_{11}(l) \\ \overline{w}_{13}(l) \end{bmatrix} \cdot r(n) \quad \text{[Equation 4]}$$

In this case, Z denotes a DMRS sequence precoded for a CDM group 1, P denotes a precoding matrix, W denotes Walsh sequence matrix, and r(n) denotes a reference signal sequence.

Hence, a signal transmitted through a physical antenna port can be represented as equation 5 described in the following.

$$z_k = p_k \cdot W \cdot r(n) \quad \text{[Equation 5]}$$

In this case, $p_k$ corresponds to a $k^{th}$ row vector. zk corresponds to a $k^{th}$ row vector of Z.

Figure 10:
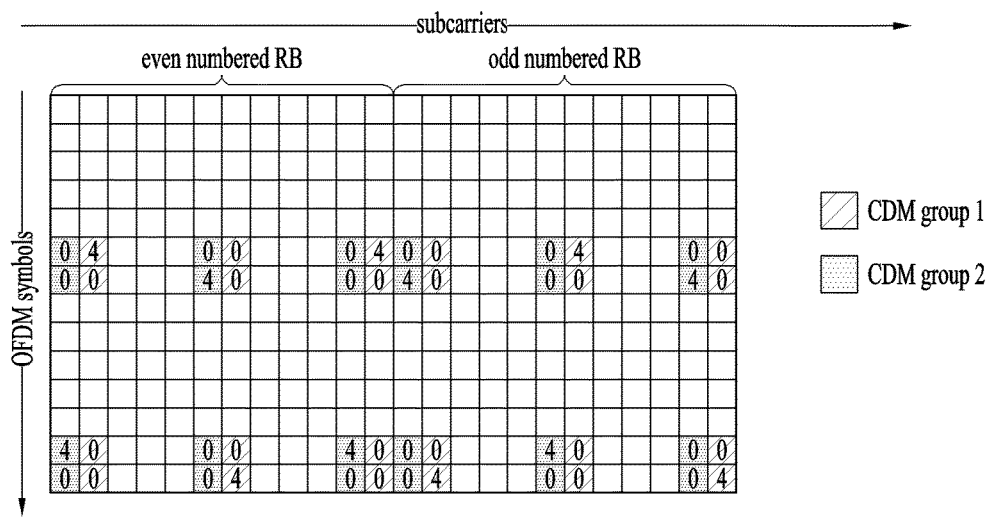
FIG. 10 is a diagram illustrating transmit power of a DMRS according to FIG. 9.

Since all elements of a $1^{st}$ row vector $p_1$ of a generally used precoding vector are configured by 1, power per RE of a signal transmitted via a first antenna can be represented as FIG. 10 when the number of transmission layers corresponds to 8. FIG. 10 illustrates a case that average transmission power of a data RE corresponds to 1. As shown in FIG. 10, although transmit power in a specific RE is greater than 1, transmit power in a different RE of the same OFDM symbol corresponds to 0. Hence, DMRS average transmit power for a specific OFDM symbol is maintained by 1. To this end, a Walsh sequence [a b c d] of a DMRS is alternately allocated or mapped in an order of [a b c d] and [d c b a] according to a subcarrier in LTE standard. In this case, Walsh sequences of an AP 11 and an AP 12 are opposite to Walsh sequences of an AP 13 and an AP 14 in sign. In the following, allocating or mapping the Walsh sequences in an order of [a b c d] and [d c b a] is referred to as a legacy pattern.

According to LTE-A spec, a base station can transmit data using up to maximum 4 layers to perform MU-MIMO transmission. In this case, the base station uses an AP 7 and an AP 8. And, the base station performs data transmission up to maximum 4 layers by 4 DMRS sequences in total using two QPSK modulated gold sequences, i.e., two gold sequence corresponding to nSCID=0 and nSCID=1, in a single cell. According to the abovementioned legacy scheme, since two DMRS sequences among the 4 DMRS sequences are orthogonal to each other, interference does not occur between the two DMRS sequences. Yet, since sequences including a different nSCID are quasi-orthogonal to each other, it is unable to avoid mutual interference between the sequences when a channel is estimated.

Figure 11:
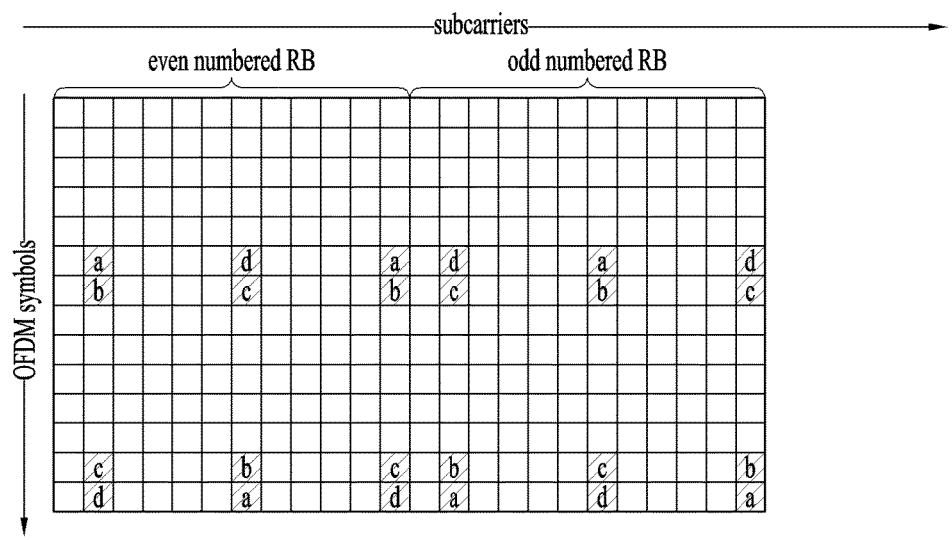
FIG. 11 is a diagram illustrating resource elements in which a DMRS is transmitted based on 4 antenna ports and an allocation pattern of an applied Walsh sequence.

In order to increase the number of DMRSs, which are orthogonal to each other and capable of being allocated between MU-MIMO UEs, to 4 from 2, it may consider a method of using legacy APs 7, 8, 11, and 13 and pairing MU-MIMO layers up to maximum 4 layers. In this case, a DMRS and a Walsh sequence allocated to the DM RS are shown in FIG. 11. The Walsh sequence applied to FIG. 11 is shown in Table 1. The abovementioned method can be applied not only to MU-MIMO but also to SU-MIMO (single user-multi input multi output). Since the above method is able to perform 4-layer transmission with DMRS overhead 12 RE per RB, it may have a merit in that transmission efficiency is increasing.

Figure 12:
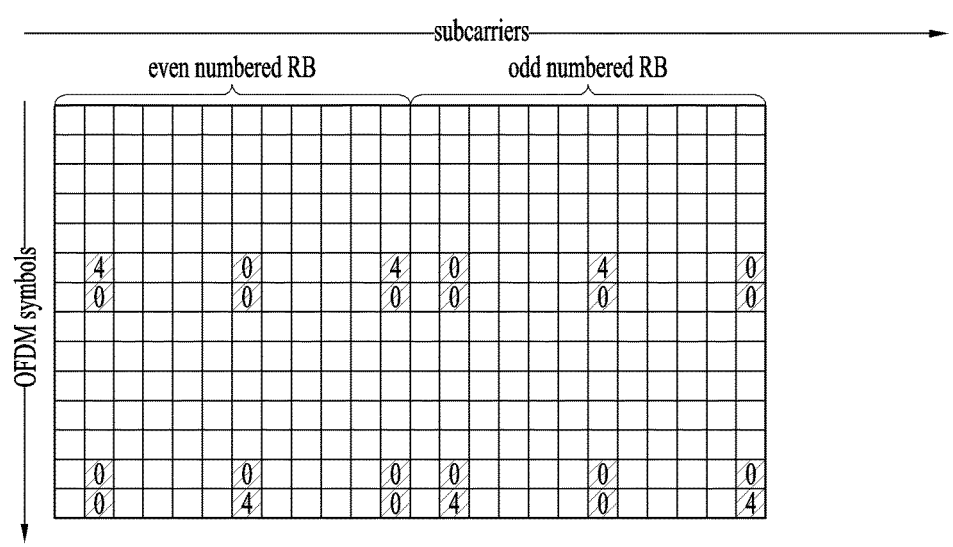
FIG. 12 is a diagram illustrating transmit power of a DMRS according to FIG. 11.

Yet, if it is assumed that Walsh sequence is allocated to repeat an order of [a b c d] and [d c b a] and all elements of a 1 row vector $p_1$ of a precoding vector are configured by 1, power per RE of a signal transmitted through a first antenna can be represented as FIG. 12 when the number of transmission layers corresponds to 4. FIG. 12 illustrates a case that average transmit power of a data RE corresponds to 1. As shown in FIG. 12, transmit power of a DMRS is not allocated to a $7^{th}$ OFDM symbol and a $13^{th}$ OFDM symbol. On the other hand, high transmit power of a DMRS is allocated to a $6^{th}$ OFDM symbol and a $14^{th}$ OFDM symbol. In other word, transmit power is not uniformly allocated according to an OFDM symbol.

The present invention proposes a method of transmitting and receiving a DMRS capable of solving the abovementioned problem and an apparatus using the same. In order to distinguish the DMRS transmitted by the proposed method from a legacy DMRS, the DMRS is referred to as DMRSs of APs 7', 8', 11', and 13'.

According to the present invention, a base station transmits a DMRS to a plurality of UEs based on a Walsh sequence pattern newly proposed in the present invention.

To this end, the base station allocates one selected from the group consisting of antenna ports #7, #8, #11, and #13 to a plurality of the UEs.

The base station generates a sequence of a reference signal or a sequence of a DMRS to be transmitted to a plurality of the UEs. A configuration for generating the sequence of the reference signal can be represented as equation 1.

The base station maps a Walsh sequence according to an antenna port corresponding to maximum 4 layers to the generated sequence of the reference signal to obtain a modulated reference signal corresponding to each antenna port.

The base station transmits the modulated reference signal corresponding to each antenna port to a corresponding UE among a plurality of UEs via each antenna port.

In this case, unlike a legacy method, the base station can transmit a DMRS to maximum 4 UEs. In particular, the maximum 4 UEs can be MU-MIMO paired.

A legacy UE receiving a DMRS of which a Walsh sequence according to an antenna port is allocated with a legacy pattern can be included in the maximum 4 UEs based on LTE standard. This is because a result value obtained by applying a Walsh sequence pattern newly proposed by the present invention is identical to a result value obtained by applying a legacy pattern according to an element value of a Walsh sequence corresponding to a specific antenna port. For example, since a Walsh sequence corresponding to an antenna port #7 is [+1 +1 +1 +1], it may have [+1+1 +1 +1] irrespective of whether the Walsh sequence pattern proposed by the present invention or the legacy pattern is applied.

Hence, if an antenna port #7 is allocated to a legacy UE, the legacy UE is able to receive a DMRS from the base station according to the present invention. Yet, as mentioned in the following, the legacy UE is also able to receive a DMRS through an antenna port #8 or an antenna port #11 depending on an embodiment.

In addition, as shown in FIG. 11, resource elements to which Walsh sequences corresponding to the antenna ports #7, 8, 11, and 13 are allocated can be allocated to resource elements of a $5^{th}$ OFDM (orthogonal frequency division multiplexing) symbol, a $6^{th}$ OFDM symbol, a $12^{th}$ OFDM symbol, and a $13^{th}$ OFDM symbol.

A user equipment (UE) receives antenna port allocation information indicating one selected from the group consisting of the antenna ports #7, #8, #11, and #13 from the base station.

Subsequently, the UE receives a DMRS based on a Walsh sequence corresponding to an allocated antenna port.

In the following, a method of transmitting and receiving a DMRS according to a Walsh sequence allocation pattern proposed by the present invention is explained in detail with reference to the attached drawings.

Proposed Method 1

Figure 13:
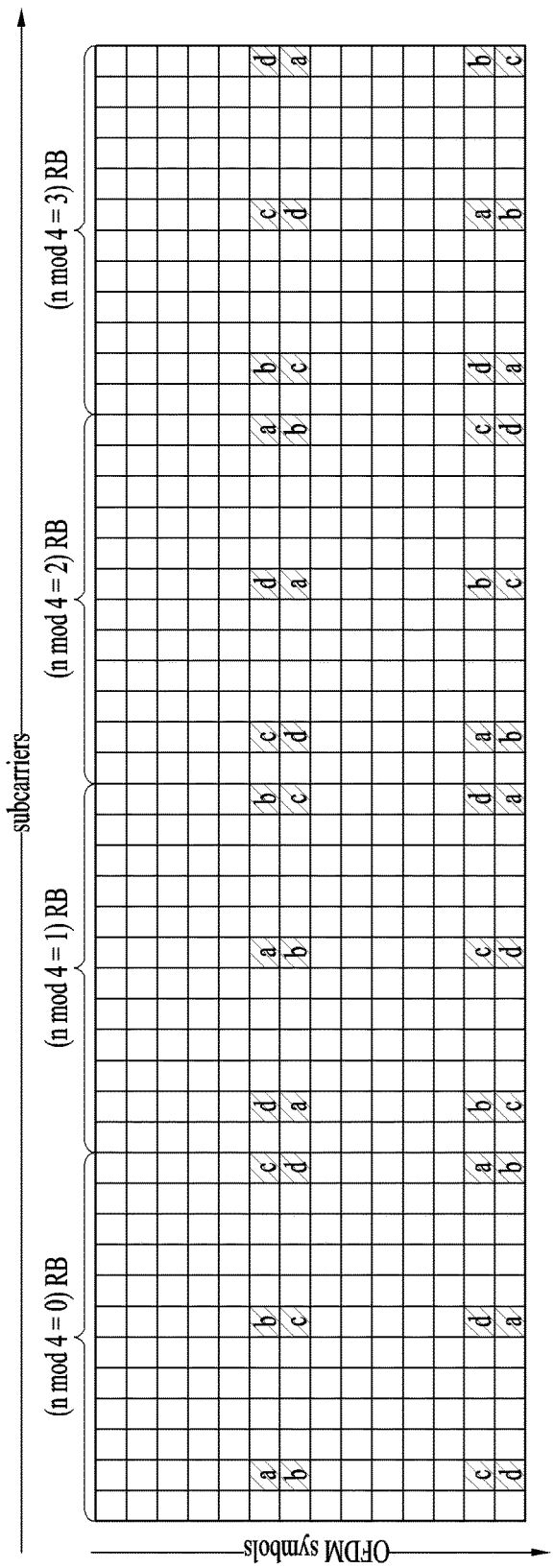
FIG. 13 is a diagram illustrating an allocation pattern of a Walsh sequence according to a first proposed scheme of the present invention.

According to a proposed method 1, as shown in FIG. 13, a Walsh sequence [a b c d] shown in table 1 is alternately mapped in an order of [a b c d], [b c d a], [c d a b], and [d a b c] along a subcarrier and an enhanced UE according to the present invention receives a DMRS of which 4 different Walsh sequence patterns are repeated. A method of mapping a Walsh sequence according to the proposed method 1 can be repeated in every 4 resource blocks.

Figure 14:
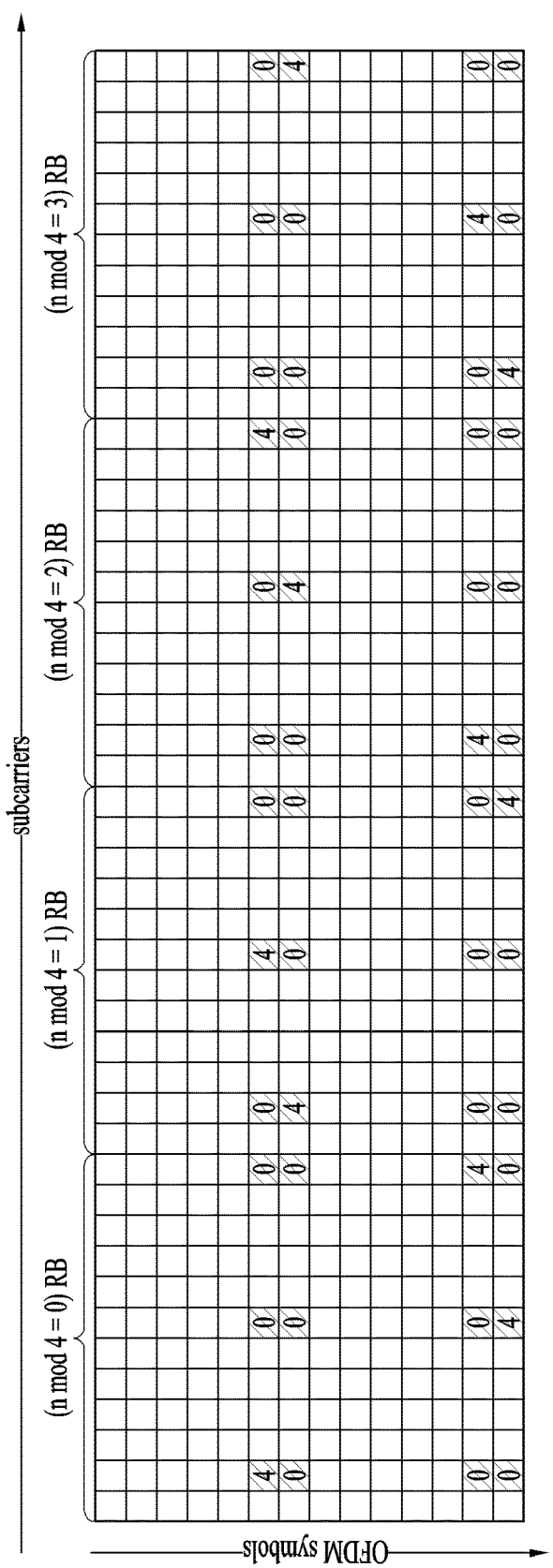
FIG. 14 is a diagram illustrating transmit power of a DMRS according to FIG. 13.

In this case, power per RE (resource element) of a signal transmitted through a first antenna can be represented as FIG. 14 when the number of transmission layers corresponds to 4. In this case, DMRSs of APs 7' and 8' are identical to DMRSs of legacy APs 7 and 8. Yet, DMRSs of APs 11' and 13' are different from DMRSs of legacy APs 11 and 13. More specifically, a Walsh sequence for the legacy AP 11 is applied in a manner of alternately applying [+1 +1 −1 −1] and [−1 −1 +1 +1] along a subcarrier to which a DMRS sequence is mapped. On the contrary, a Walsh sequence for the AP 11' according to the proposed method is applied in a manner of alternately applying [+1 +1 −1 −1], [+1 −1 −1 +1], [−1 −1 +1 +1], and [−1 +1 +1 −1] along a subcarrier to which a DMRS sequence is mapped. And, [+1 −1 −1 +1] corresponding to a Walsh sequence for the legacy AP 13 is identically applied to all subcarriers. On the contrary, a Walsh sequence for the AP 13' according to the proposed method 1 is applied in a manner of alternately applying [+1 −1 −1 +1], [−1 −1 +1 +1], [−1 +1 +1 −1], and [+1 +1 −1 −1] along a subcarrier to which a DMRS sequence is mapped.

According to the proposed method 1, an enhanced UE, which is able to receive a DMRS to which Walsh sequence according to an antenna port is mapped, can be MU-MIMO paired with a legacy UE based on the characteristic that the DMRSs of the APs 7' and 8' are identical to the DMRSs of the legacy APs 7 and 8. For example, if an antenna port #7 is allocated to an enhanced UE and an antenna port #8 is allocated to a legacy UE, the enhanced UE can be MU-MIMO paired with the legacy UE. And, if the antenna port #7 is allocated to the legacy UE and the antenna port #8 is allocated to the enhanced UE, the enhanced UE can be MU-MIMO paired with the legacy UE.

Proposed Method #2

Figure 15:
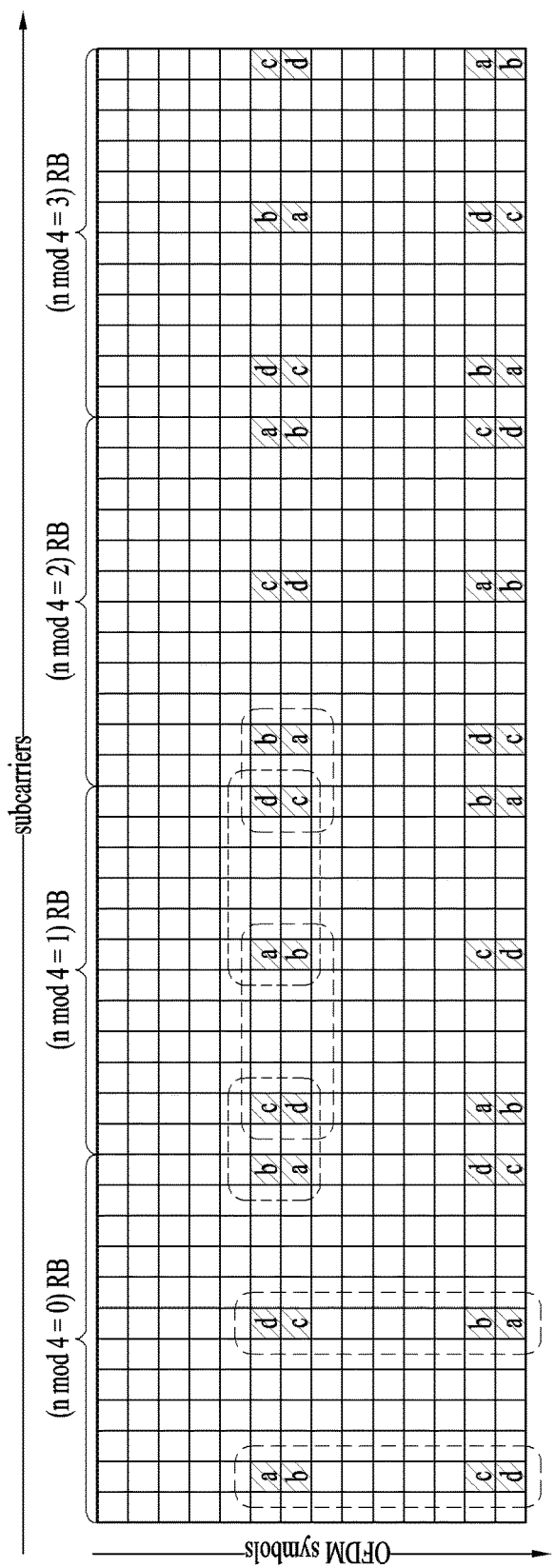
FIG. 15 is a diagram illustrating an allocation pattern of a Walsh sequence according to a second proposed scheme of the present invention.
Figure 16:
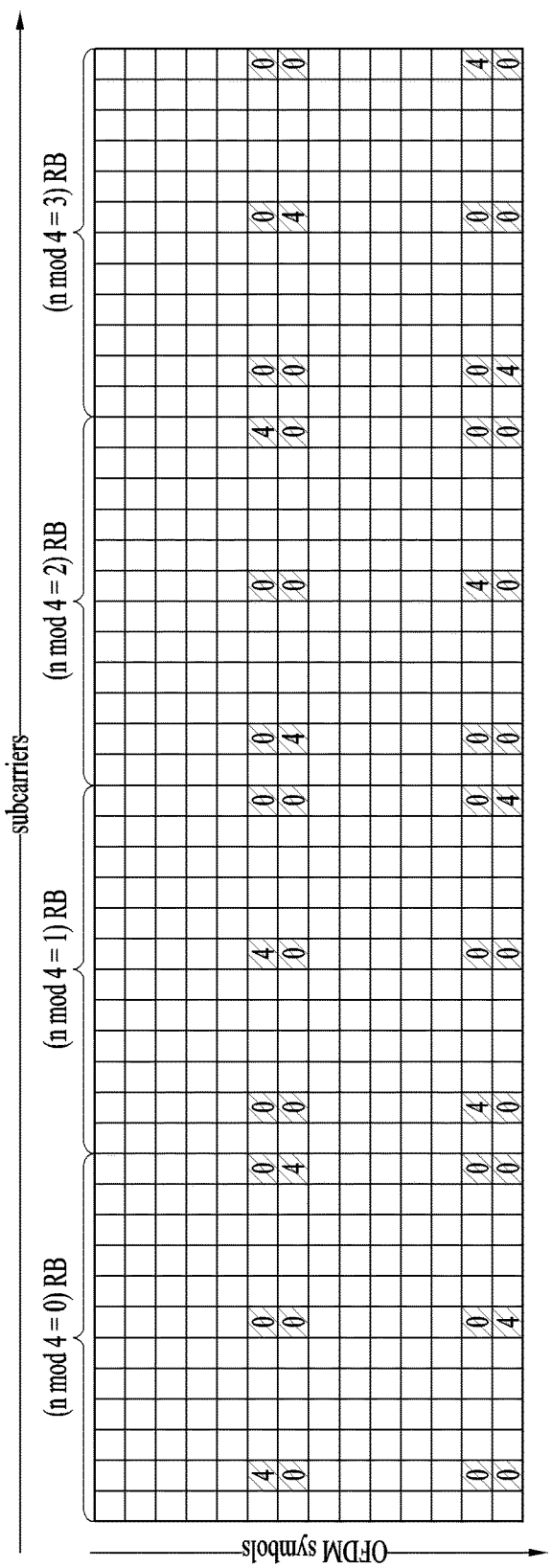
FIG. 16 is a diagram illustrating transmit power of a DMRS according to FIG. 15.

According to a proposed method 2, as shown in FIG. 15, a Walsh sequence [a b c d] shown in table 1 is alternately mapped in an order of [a b c d], [d c b a], [b a d c], and [c d a b] along a subcarrier and an enhanced UE according to the present invention receives a DMRS of which 4 different Walsh sequence patterns are repeated. A method of mapping a Walsh sequence according to the proposed method 2 can be repeated in every 4 resource blocks. In this case, power per RE (resource element) of a signal transmitted through a first antenna can be represented as FIG. 16 when the number of transmission layers corresponds to 4.

As shown in FIG. 15, according to the proposed method 2, a. b. c. d. corresponding to elements of a Walsh sequence of an AP are mapped (or, allocated) in a time axis direction (OFDM symbol direction) in a DMRS to which the Walsh sequence is allocated. And, a, b, c and d corresponding to elements of a Walsh sequence of an AP are mapped (or, allocated) in a frequency axis (subcarrier direction) as well. In particular, according to the proposed method 2, when DMRSs are de-spread for 4 resource elements not only along the time axis direction (OFDM symbol direction) but also along the frequency axis direction (subcarrier direction), it may be able to guarantee orthogonality between DMRSs of 4 APs (AP 7' AP 8', AP 11', AP 13').

For reference, in order to efficiently estimate a channel in a time-selective channel and a frequency-selective channel, it is important to achieve both orthogonality in time axis direction and orthogonality in frequency axis direction at the same time among 4 DMRS sequences. In particular, it is important to satisfy a CDM (code division multiplexing) length 4 in time domain, a CDM length 4 in frequency domain, and CDM (length 2)*(length 2) in time/frequency domain. Due to the characteristic, channel estimation is performed in the frequency-selective channel by de-spreading a DMRS in time axis and channel estimation is performed in the time-selective channel by de-spreading a DMRS in frequency axis to eliminate interference between DMRS ports in selective fading channel environment.

According to the proposed method 2, although DMRSs of the APs 7' and 11' are identical to DMRSs of the legacy APs 7 and 11 DMRSs of the APs 8' and 13' are different from DMRSs of the legacy APs 8 and 13. More specifically, a Walsh sequence for the legacy AP 8 is applied in a manner of alternately applying [+1 −1 −1 −1] and [−1 +1 −1 +1] along a subcarrier to which a DMRS sequence is mapped. On the contrary, a Walsh sequence for the AP 8' according to the proposed method 2 is applied in a manner of alternately applying [+1 −1 +1 −1], [−1 +1 −1 +1], [−1 +1 −1 +1], and [+1 −1 +1 −1] along a subcarrier to which a DMRS sequence is mapped. And, [+1 −1 −1 +1] corresponding to a Walsh sequence for the legacy AP 13 is identically applied to all subcarriers. On the contrary, a Walsh sequence for the AP 13' according to the proposed method 2 is applied in a manner of alternately applying [+1 −1 −1 +1], [+1 −1 −1 +1],

[−1 +1 +1 −1], and [−1 +1 +1 −1] along a subcarrier to which a DMRS sequence is mapped.

According to the proposed method 2, an enhanced UE, which is able to receive a DMRS to which Walsh sequence according to an antenna port is mapped, can be MU-MIMO paired with a legacy UE based on the characteristic that the DMRS of the AP 7' is identical to the DMRS of the legacy AP 7. For example, if an antenna port #7 is allocated to an enhanced UE and an antenna port #8 is allocated to a legacy UE, the enhanced UE can be MU-MIMO paired with the legacy UE.

Proposed Method 3

Figure 17:
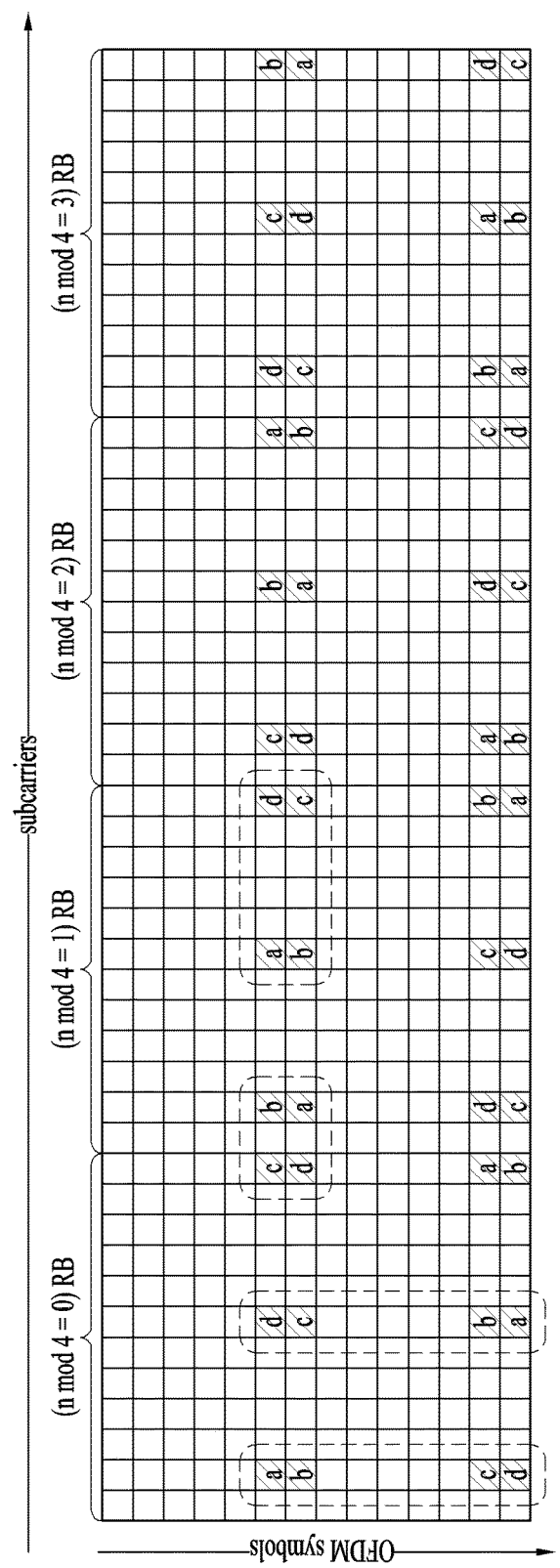
FIG. 17 is a diagram illustrating an allocation pattern of a Walsh sequence according to a third proposed scheme of the present invention.

According to a proposed method 3, as shown in FIG. 17, a Walsh sequence [a b c d] shown in table 1 is alternately mapped in an order of [a b c d], [d c b a], [c d a b], and [b a d c] along a subcarrier and, an enhanced UE according to the present invention receives a DMRS of which 4 different Walsh sequence patterns are repeated. A method of mapping a Walsh sequence according to the proposed method 3 can be repeated in every 4 resource blocks. In this case, power per RE (resource element) of a signal transmitted through a first antenna can be represented as FIG. 18 when the number of transmission layers corresponds to 4.

As shown in FIG. 17, according to the proposed method 3, when a DMRS is de-spread in a frequency axis direction, it may be able to guarantee orthogonality between DMRSs of 4 APs.

According to the proposed method 3, although DMRSs of the APs 7' and 8' are identical to DMRSs of the legacy APs 7 and 8, DMRSs of the APs and 13' are different from DMRSs of the legacy APs 11 and 13. More specifically, a Walsh sequence for the legacy AP 1 is applied in a manner of alternately applying [+1 +1 −1 −1] and [−1 −1 +1 +1] along a subcarrier to which a DMRS sequence is mapped. On the contrary, a Walsh sequence for the AP 11' according to the proposed method 3 is applied in a manner of alternately applying [+1 +1 −1 −1], [−1 −1 +1 +1], [−1 −1 +1 +1], and [+1 +1 −1 −1] along a subcarrier to which a DMRS sequence is mapped. And, [+1 −1 −1 +1] corresponding to a Walsh sequence for the legacy AP 13 is identically applied to all subcarriers. On the contrary, a Walsh sequence for the AP 13' according to the proposed method 3 is applied in a manner of alternately applying [+1 −1 −1 +1], [+1 −1 −1 +1], [−1 +1 +1 −1], and [−1 +1 +1 −1] along a subcarrier to which a DMRS sequence is mapped.

According to the proposed method 3, an enhanced UE, which is able to receive a DMRS to which Walsh sequence according to an antenna port is mapped, can be MU-MIMO paired with a legacy UE based on the characteristic that the DMRSs of the APs 7' and 8' are identical to the DMRSs of the legacy APs 7 and 8. For example, if an antenna port #7 is allocated to an enhanced UE and an antenna port #8 is allocated to a legacy UE, the enhanced UE can be MU-MIMO paired with the legacy UE. And, if the antenna port #7 is allocated to the legacy UE and the antenna port #8 is allocated to the enhanced UE, the enhanced UE can be MU-MIMO paired with the legacy UE.

Proposed Method 4

Figure 18:
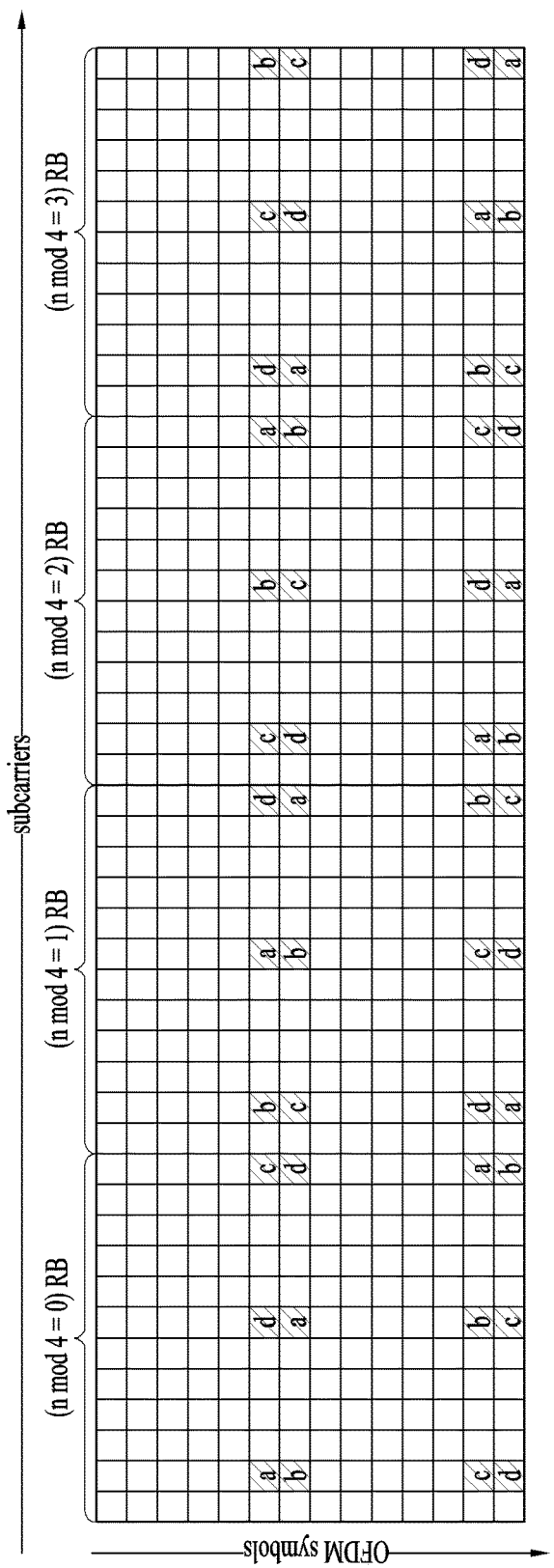
FIG. 18 is a diagram illustrating an allocation pattern of a Walsh sequence according to a fourth proposed scheme of the present invention.

According to a proposed method 4, as shown in FIG. 18, a Walsh sequence [a b c d] shown in table 1 is alternately mapped in an order of [a b c d], [d a b c], [c d a b], and [b c d a] along a subcarrier and an enhanced UE according to the present invention receives a DMRS of which 4 different Walsh sequence patterns are repeated. A method of mapping a Walsh sequence according to the proposed method 4 can be repeated in every 4 resource blocks.

According to the proposed method 4, although DMRSs of the APs 7' and 8' are identical to DMRSs of the legacy APs 7 and 8, DMRSs of the APs 11' and 13' are different from DMRSs of the legacy APs 11 and 13. More specifically, a Walsh sequence for the legacy AP 11 is applied in a manner of alternately applying [+1 +1 −1 −1] and [−1 −1 +1 +1] along a subcarrier to which a DMRS sequence is mapped. On the contrary, a Walsh sequence for the AP 11' according to the proposed method 4 is applied in a manner of alternately applying [+1 +1 −1 −1], [−1 +1 +1 −1], [−1 −1 +1 +1], and [+1 −1 −1 +1] along a subcarrier to which a DMRS sequence is mapped. And, [+1 −1 −1 +1] corresponding to a Walsh sequence for the legacy AP 13 is identically applied to all subcarriers. On the contrary, a Walsh sequence for the AP 13' according to the proposed method 4 is applied in a manner of alternately applying [+1 −1 −1 +1], [+1 +1 −1 −1], [−1 +1 +1 −1], and [−1 −1 +1 +1] along a subcarrier to which a DMRS sequence is mapped.

According to the proposed method 4, an enhanced UE, which is able to receive a DMRS to which Walsh sequence according to an antenna port is mapped, can be MU-MIMO paired with a legacy UE based on the characteristic that the DMRSs of the APs 7' and 8' are identical to the DMRSs of the legacy APs 7 and 8. For example, if an antenna port #7 is allocated to an enhanced UE and an antenna port #8 is allocated to a legacy UE, the enhanced UE can be MU-MIMO paired with the legacy UE. And, if the antenna port #7 is allocated to the legacy UE and the antenna port #8 is allocated to the enhanced UE, the enhanced UE can be MU-MIMO paired with the legacy UE.

Proposed Method 5

Figure 19:
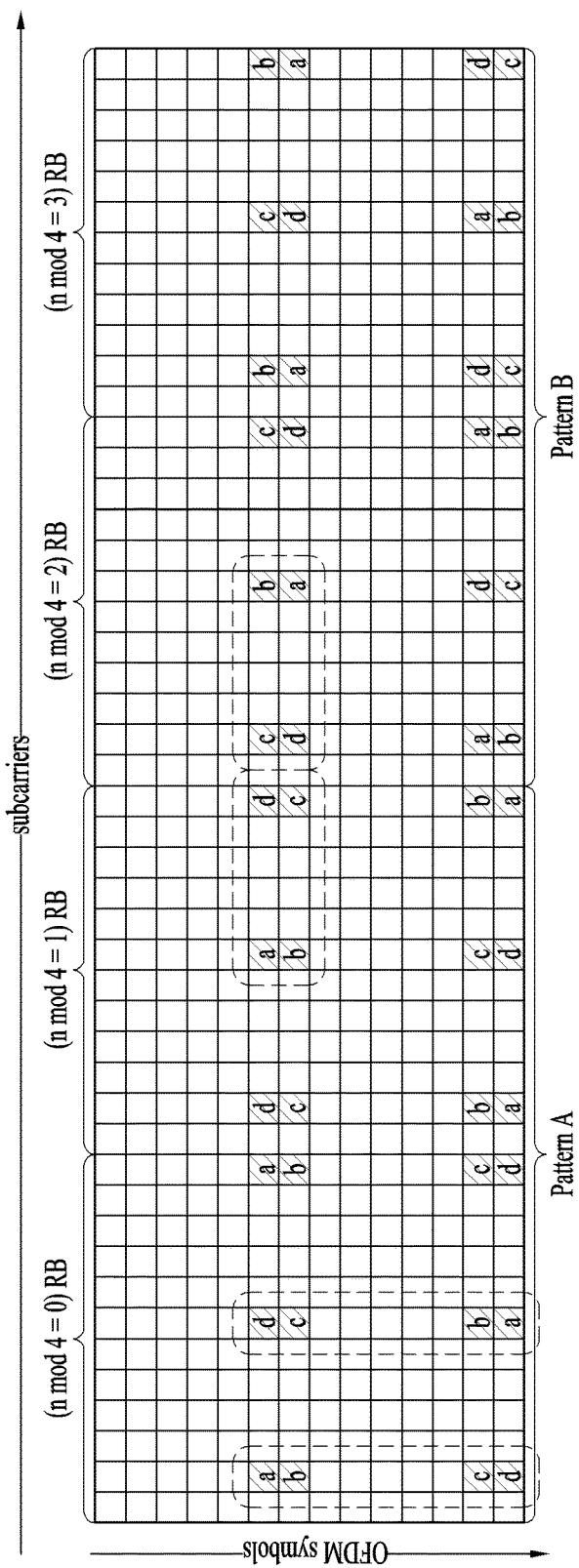
FIG. 19 is a diagram illustrating an allocation pattern of a Walsh sequence according to a fifth proposed scheme of the present invention.

According to a proposed method 5, as shown in FIG. 19, a Walsh sequence [a b c d] shown in table 1 is alternately and sequentially mapped in an order of [a b c d] and [d c b a] along a subcarrier. In this case, Walsh sequence values for APs 11' and 13' are mapped by changing a sign in every one cycle. An enhanced UE according to the present invention receives a DMRS to which a Walsh sequence is mapped according to the proposed method 5.

More specifically, a Walsh sequence for the AP 11' is alternately mapped (or, allocated) in an order of [a b c d] and [d c b a]. In this case, as the Walsh sequence for the AP 11', [+1 +1 −1 −1] and sign-changed [−1 −1 +1 +1] are alternately applied. And, a Walsh sequence for the AP 13' is alternately mapped (or, allocated) in an order of [a b c d] and [d c b a]. In this case, as the Walsh sequence for the AP 13', [+1 −1 −1 +1] and sign-changed [−1 +1 +1 −1] are alternately applied. In particular, when a Walsh sequence is mapped according to an antenna port, if element values of the Walsh sequence according to an antenna port are applied, consequently, it may indicate a result value identical to the proposed method 3.

A method of mapping a DMRS sequence using the proposed method 3 or 5 can be represented as equation 6 described in the following.

$$a_{k,l}^{(p)} = w_p(l') \cdot r(3 \cdot l' \cdot N_{RB}^{max,DL} + 3 \cdot n_{PRB} + m')$$ [Equation 6]

where

-continued $$w_p(i) = \begin{cases} \overline{w}_p(i) & (m' + n_{PRB})\mod 4 = 0 \\ \overline{w}_p(3-i) & (m' + n_{PRB})\mod 4 = 1 \\ \overline{w}_p((i+2)\mod 4) & (m' + n_{PRB})\mod 4 = 2 \\ \overline{w}_p((5-i)\mod 4) & (m' + n_{PRB})\mod 4 = 3 \end{cases}$$

$$k = 5m' + N_{sc}^{RB} n_{PRB} + k'$$

$$k' = \begin{cases} 1 & p \in \{7, 8, 11, 13\} \\ 0 & p \in \{9, 10, 12, 14\} \end{cases}$$

$$l = \begin{cases} l'\mod 2 + 2 & \text{if in a special subframe with configuration 3, 4, 8 or 9} \\ l'\mod 2 + 2 + 3\lfloor l'/2 \rfloor & \text{if in a special subframe with configuration 1, 2, 6, or 7} \\ l'\mod 2 + 5 & \text{if not in a special subframe} \end{cases}$$

$$l' = \begin{cases} 0, 1, 2, 3 & \text{if } n_s \mod 2 = 0 \text{ and in a special subframe with configuration 1, 2, 6, or 7} \\ 0, 1 & \text{if } n_s \mod 2 = 0 \text{ and not in special subframe with configuration 1, 2, 6, or 7} \\ 2, 3 & \text{if } n_s \mod 2 = 1 \text{ and not in special subframe with configuration 1, 2, 6, or 7} \end{cases}$$

$$m' = 0, 1, 2$$

Consequently, since a DMRS sequence to which a Walsh sequence is mapped according to the proposed method 3 is identical to a DMRS sequence to which a Walsh sequence is mapped according to the proposed method 5, an enhanced UE, which is able to receive a DMRS to which a Walsh sequence according to an antenna port according to the proposed method 5, can be MU-MIMO paired with a legacy UE based on the characteristic that the DMRSs of the APs 7' and 8' are identical to the DMRSs of the legacy APs 7 and 8. For example, if an antenna port #7 is allocated to an enhanced UE and an antenna port #8 is allocated to a legacy UE, the enhanced UE can be MU-MIMO paired with the legacy UE. And, if the antenna port #7 is allocated to the legacy UE and the antenna port #8 is allocated to the enhanced UE, the enhanced UE can be MU-MIMO paired with the legacy UE.

Proposed Method 6

According to a proposed method 6, as shown in FIG. 19, a method of mapping a Walsh sequence [a b c d] shown in table 1 is determined according to a resource block index from among a pattern A scheme of alternately and sequentially mapping the Walsh sequence in an order of [a b c d] and [d c b a] along a subcarrier and a pattern B scheme of alternately and sequentially mapping the Walsh sequence in an order of [c d a b] and [b a d c] along a subcarrier. An enhance UE according to the present invention receives a DMRS to which a Walsh sequence is mapped according to the proposed method 6.

According to an example shown in FIG. 19, a Walsh sequence is mapped (allocated) using the pattern A scheme in a resource block where a [resource block index mod 4] value corresponds to 0 or 1. And, a Walsh sequence is mapped (allocated) using the pattern B scheme in a resource block where a [resource block index mod 4] value corresponds to 2 or 3. According to the abovementioned Walsh sequence mapping scheme, it may be able to guarantee orthogonality between DMRSs of 4 APs in a group of 2 resource blocks even when a DMRS is de-spread along a frequency axis.

Figure 20:
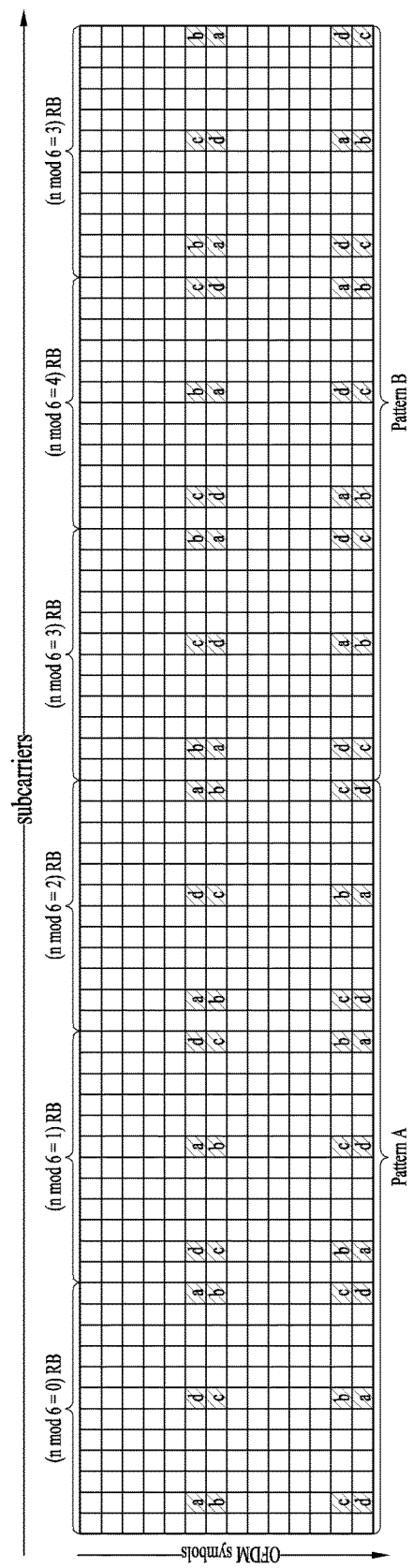
FIG. 20 is a diagram illustrating an allocation pattern of a Walsh sequence according to a sixth proposed scheme of the present invention.

The proposed method 6 can be generalized as follows. Whether a Walsh sequence is mapped using the pattern A scheme or the pattern B scheme can be determined in a unit of N number of resource groups. In particular, a Walsh sequence is mapped using the pattern A scheme in the first N number of resource block groups and a Walsh sequence can be mapped using the pattern B scheme in the second N number of resource block groups. For example, FIG. 20 illustrates a scheme (pattern) of mapping a Walsh sequence to a DMRS when N corresponds to 3.

In the proposed method 6, a parameter N, which determines the number of resource blocks at which a mapping method of a Walsh sequence is changed, can be determined by a function according to a system band. For example, the parameter N can be configured to be identical to a precoding resource block group (PRG) size P under the assumption that the same precoding is to be used. Or, the parameter N can be configured to be a multiple of the P. In this case, the parameter N can be provided as a table 4 described in the following.

TABLE 4

| System Bandwidth ($N_{RB}^{DL}$) | PRG Size (N) (PRBs) |
|---|---|
| ≤10 | 1 |
| 11-26 | 2 |
| 27-63 | 3 |
| 64-110 | 2 |

According to the proposed method 6, if the same mapping pattern is used for a Walsh sequence in a PRG, it may be able to guarantee orthogonality between DMRSs of 4 APs even when de-spreading is performed along a frequency axis.

When de-spreading is performed in a manner of gathering DMRSs belonging to a different PRG, since different precoding is applied to PRGRs different from each other, the de-spreading is not permitted. In particular, although an allocation pattern of a Walsh sequence, which is applied to a different PRG, is changed, it does not cause any specific problem.

As a specific method of the proposed method 6, it may be able to determine a method of mapping a Walsh sequence [a b c d] shown in table 1 according to a PRB index function value among the pattern A scheme and the pattern B scheme.

For example, if a PRB index (or, an integer value of (resource block index/P)) corresponds to an even number, the Walsh sequence is mapped using the pattern A scheme. If the PRB index corresponds to an add number, the Walsh sequence can be mapped using the pattern B scheme. When the Walsh sequence is mapped in a PRO using the pattern A scheme, a preferentially applied sequence among Walsh sequences [a b c d] and [d c b a] can be determined based on a first resource block index of the PRG.

As a different example, in the proposed method 6, a parameter N, which determines the number of resource blocks at which a mapping method of a Walsh sequence is changed, can be designated by a base station and the base station can inform a UE of the parameter N via RRC (radio resource control) signaling.

MU-MIMO Pairing Between Enhanced UE and Legacy UE

According to the mapping pattern of the Walsh sequence proposed by the present invention, such a characteristic that a DMRS of an AP 7' according to the present invention and a DMRS of an AP 7 according to a legacy LTE spec are the same Walsh sequence is very important. In other word, when a DMRS of the AP 7' for an enhanced UE and a DMRS of the AP 8 for a legacy UE are used together, the characteristic that the DMRS of the AP 7' and the DMRS of the legacy AP 7 are the same sequence is important for maintaining orthogonality between DMRSs when the legacy UE estimates a channel. This is because, when the legacy UE estimates a channel, the legacy UE is unaware of whether the orthogonality between DMRSs is achieved in time domain or frequency domain.

In particular, when a Walsh sequence is allocated according to an antenna port in accordance with the proposed method 1, 3, 4, or 5 among the aforementioned proposed methods, since a DMRS of an AP' according to a proposed method is a sequence identical to a DMRS of an AP 8 according to a legacy LTE spec, the DMRS of the AP 8' for an enhanced UE and the DMRS of the AP 7 for a legacy UE can be used together.

For example, according to the proposed method 2, a DMRS of a legacy AP 7 is identical to a DMRS of an AP 7'. Hence, PDSCH using a DMRS of an AP 8 of the legacy UE can be MU-MIMO paired with PDSCH using a DMRS of an AP 7' of the enhanced UE. In this case, if the enhanced UE receives PDSCH using the DMRS of the AP 7', the enhanced UE can use an enhanced signal reception technique in consideration of a situation that PDSCH using a DMRS of an AP 8, an AP 8', an AP 11', or an AP 13' is MU-MIMO transmitted together. In this case, it may not consider a situation that the DMRS oldie AP 8 and the DMRS of the AP 8' exist at the same time. When a base station transmits a DMRS based on a Walsh sequence allocated by a legacy pattern, PDSCH using a DMRS of an AP 7 of the legacy UE can be MU-MIMO paired with PDSCH using a DMRS of an AP 8' of the enhanced UE.

Or, when the enhanced UE is MU-MIMO paired with the legacy UE in an RB, the RB can be restricted to a specific RB. For example, when a Walsh sequence according to an antenna port is allocated as FIG. 19 or FIG. 20, the enhanced UE can be MU-MIMO paired with the legacy UE in an RB only to which the Walsh sequence according to an antenna port is mapped using the pattern A scheme. In other word, when a Walsh sequence according to an antenna port is mapped to an RB using the pattern B scheme, the enhanced UE is unable to be MU-MIMO paired with the legacy UE in the RB. This is because the legacy UE is unable to estimate a channel of a DMRS to which the Walsh sequence is mapped using the pattern B scheme.

As an additional embodiment, a DMRS is transmitted in a first PRB set in a manner of mapping a Walsh sequence to the DMRS according to one Walsh sequence mapping method selected from the group consisting of the proposed methods 1 to 5. In addition, a DMRS is transmitted in a second PRB set in a manner of mapping a Walsh sequence to the DMRS while [a b c d] pattern and [d c b a] pattern of the Walsh sequence are repeated according, to LTE standard. In this case, maximum 2 UEs can be MU-MIMO paired in the second PRB set according to LTE standard.

The enhanced UE can determine whether or a DMRS of a specific AP is transmitted via a blind detection (BD) method. In this case, the enhanced UE can determine whether or not the DMRS of the specific AP is transmitted using such a method as an enhanced MMSE receiver, symbol level interference cancellation, maximum likelihood receiver, or the like. When a specific antenna port is allocated to the enhanced UE, a list of APs of interference PDSCH on which blind decoding is to be performed is shown in the following.

TABLE 5

| AP of allocated or requested PDSCH | AP candidate of interfering PDSCH |
|---|---|
| AP 7' | AP 8, AP 8', AP 11', or AP 13' |
| AP 8' | AP 7', AP 11', or AP 13' |
| AP 11' | AP 7', AP 8', or AP 13' |
| AP 13' | AP 7', AP 8', or AP 11' |

Figure 21:
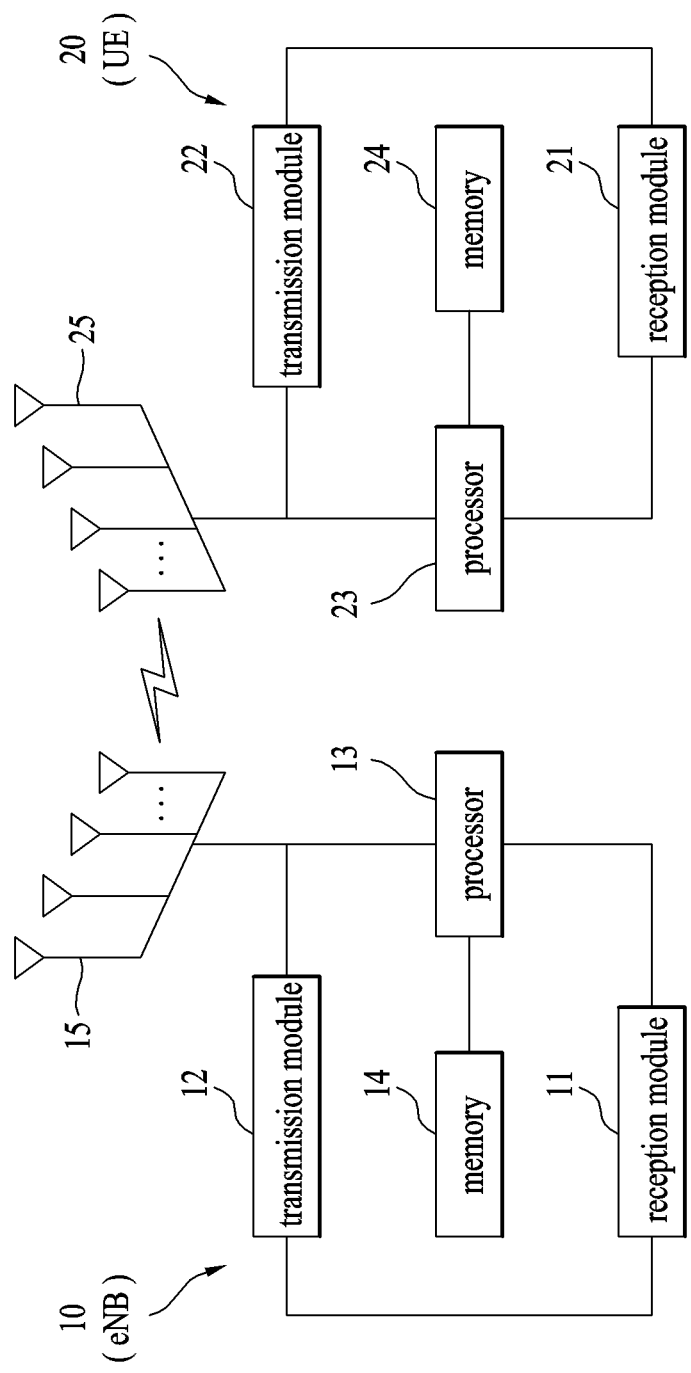
FIG. 21 is a diagram illustrating configurations of a transmission device and a user equipment according to the present invention.

Configuration of Apparatuses According to One Embodiment of the Present Invention FIG. 21 is a diagram illustrating configurations of a transmit point and a UE according to one embodiment of the present invention.

Referring to FIG. 21, a transmit point 1010 may include a reception module 1011, a transmission module 1012, a processor 1013, a memory 1014, and a plurality of antennas 1015. The antennas 1015 represent the transmit point that supports MIMO transmission and reception. The reception module 1011 may receive various signals, data and information from a UE on uplink. The transmission module 1012 may transmit various signals, data and information to a UE on downlink. The processor 1013 may control overall operation of the transmit point 1010.

The processor 1013 of the transmit point 1010 according to one embodiment of the present invention may perform processing operations necessary for the embodiments described above.

Additionally, the processor 1013 of the transmit point 1010 may function to computationally process information received by the transmit point 1010 or information to be transmitted to the outside, etc. The memory 1014, which may be replaced with an element such as a buffer (not shown), may store the computationally processed information for a predetermined time.

Referring to FIG. 21, a UE 1020 may include a reception module 1021, a transmission module 1022, a processor 1023, a memory 1024, and a plurality of antennas 1025. The antennas 1025 mean that the UP supports MIMO transmission and reception. The reception module 1021 may receive various signals, data and information from an eNB on downlink. The transmission module 1022 may transmit various signals, data and information to the eNB on uplink. The processor 1023 may control overall operation of the UE 1020.

The processor 1023 of the UE 1020 according to one embodiment of the present invention may perform processing operations necessary for the embodiments described above.

Additionally, the processor 1023 may function to computationally process information received by the UE 1020 or information to be transmitted to the outside, and the memory 1024, which may be replaced with an element such as a buffer (not shown), may store the computationally processed information for a predetermined time.

The configurations of the transmit point and the UP as described above may be implemented such that the above-described embodiments are independently applied or two or more thereof are simultaneously applied, and description of redundant parts is omitted for clarity.

Description of the transmit point 1010 in FIG. 21 may also be applied to a relay which serves as a downlink transmitter or an uplink receiver, and description of the UE 1020 may be equally applied to a relay which serves as a downlink receiver or an uplink transmitter.

The embodiments of the present invention may be implemented through various means, for example, hardware, firmware, software, or a combination thereof.

When implemented by hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented by firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to have the widest scope corresponding to the principles and novel features disclosed herein.

The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to have the widest scope consistent with the principles and novel features disclosed herein. In addition, claims that are not explicitly cited in each other in the appended claims may be presented in combination as an embodiment of the present invention or included as a new claim by subsequent amendment after the application is filed

INDUSTRIAL APPLICABILITY

The embodiments of the present invention as described above are applicable to various mobile communication systems.

What is claimed is:

1. A method of transmitting a demodulation reference signal (DMRS), which is transmitted by a base station in a wireless communication system, the method comprising:
allocating one selected from a group comprising antenna ports #7, #8, #11, and #13 to each of a plurality of user equipments (UEs), respectively;
acquiring a demodulation reference signal DMRSp of an antenna port p by mapping a Walsh sequence Wp corresponding to the antenna port p to a reference signal sequence; and
transmitting the DMRSp to a corresponding UE among the plurality of UEs through the antenna port p in a first physical resource block (PRB),
wherein the Walsh sequence Wp=[a b c d] is mapped to the reference signal sequence in a time direction and is mapped to repeat an order of [a b c d] pattern, [d c b a] pattern, [b a d c] pattern, and [c d a b] pattern along a frequency direction,
wherein the plurality of UEs correspond to maximum 4 UEs,
wherein the p satisfies p ∈{#7, #8, #11, #13}, and
wherein each element value of the Walsh sequence Wp=[a b c d] is determined based on below Table 1:

TABLE 1

| Antenna port p | [a b c d] |
|---|---|
| #7 | [+1 +1 +1 +1] |
| #8 | [+1 −1 +1 −1] |
| #11 | [+1 +1 −1 −1] |
| #13 | [+1 −1 −1 +1] |

2. The method of claim 1, wherein when a legacy UE is included in the plurality of UEs, the antenna port #7 is allocated to the legacy UE.

3. The method of claim 1, further comprising transmitting the DMRSp to maximum 2 UEs among the plurality of UEs through the antenna port p in a second PRB,
wherein the Walsh sequence Wp=[a b c d] is mapped to the reference signal sequence in a time direction in the second PRB and is mapped to repeat an order of [a b c d] pattern and [d c b a] pattern along a frequency direction.

4. A method of receiving a demodulation reference signal (DMRS), which is received by a user equipment (UE) in a wireless communication system, the method comprising:
receiving antenna port allocation information indicating one selected from a group comprising antenna ports #7, #8, #11, and #13; and
receiving the DMRS based on a Walsh sequence corresponding to an allocated antenna port,
wherein a Walsh sequence [a b c d] corresponding to the allocated antenna port is mapped in a time direction and is mapped to repeat an order of [a b c d] pattern, [d c b a] pattern, [b a d c] pattern, and [c d a b] pattern along a frequency direction, and wherein each element value of a Walsh sequence according to an antenna port is determined based on below Table 1:

TABLE 1

| Antenna port p | [a b c d] |
|---|---|
| #7 | [+1 +1 +1 +1] |
| #8 | [+1 −1 +1 −1] |
| #11 | [+1 +1 −1 −1] |
| #13 | [+1 −1 −1 +1] |

5. The method of claim 4, wherein blind decoding is performed to determine whether or not a demodulation reference signal is transmitted through the allocated antenna port and one or more different antenna ports,
wherein an antenna port on which the blind decoding is performed by the UE is determined based on below Table 2 according to an antenna port allocated to the UE:

TABLE 2

| Allocated antenna port | Antenna ports on which blind decoding is performed |
|---|---|
| #7 | #8, #8', #11, #13 |
| #8 | #7, #11, #13 |
| #11 | #7, #8, #13 |
| #13 | #7, #8, #11 | and
wherein an antenna port #8' of Table 2 indicates an antenna port where a Walsh sequence [e f g h] corresponding to an antenna port #8 is mapped to repeat an order of [e f g h] pattern and [h g f e] pattern to transmit a modulation reference signal.

6. The method of claim 4, wherein when an antenna port #7 is allocated to the UE, the UE is multi user—multi input multi output (MU—MIMO) paired with a legacy UE.

7. A base station for transmitting a demodulation reference signal (DMRS) in a wireless communication system, the base station comprising:
a transmitter; and
a processor configured to control the transmitter,
wherein the processor is configured to:
allocate one selected from a plurality of antenna ports comprising antenna ports #7, #8, #11, and #13 to each of a plurality of user equipments (UEs), respectively;
acquire a demodulation reference signal DMRSp of an antenna port p by mapping a Walsh sequence Wp corresponding to the antenna port p to a reference signal sequence; and
transmit the DMRSp to a corresponding UE among the plurality of UEs through the antenna port p in a first physical resource block (PRB),
wherein the Walsh sequence Wp=[a b c d] is mapped to the reference signal sequence in a time direction and is mapped to repeat an order of [a b c d] pattern, [d c b a] pattern, [b a d c] pattern, and [c d a b] pattern along a frequency direction,
wherein the plurality of UEs correspond to maximum 4 UEs,
wherein the p satisfies p∈{#7, #8, #11, #13}, and
wherein each element value of the Walsh sequence Wp=[a b c d] is determined based on below Table 1:

TABLE 1

| Antenna port p | [a b c d] |
|---|---|
| #7 | [+1 +1 +1 +1] |
| #8 | [+1 −1 +1 −1] |
| #11 | [+1 +1 −1 −1] |
| #13 | [+1 −1 −1 +1] |

8. A user equipment for receiving a demodulation reference signal (DMRS) in a wireless communication system, the user equipment comprising:
a receiver; and
a processor configured to control the receiver,
wherein the processor is configured to:
receive antenna port allocation information indicating one selected from a group comprising antenna ports #7, #8, #11, and #13; and
receive the DMRS based on a Walsh sequence corresponding to an allocated antenna port,
wherein a Walsh sequence [a b c d] corresponding to the allocated antenna port is mapped in a time direction and is mapped to repeat an order of [a b c d] pattern, [d c b a] pattern, [b a d c] pattern, and [c d a b] pattern along a frequency direction, and
wherein each element value of a Walsh sequence according to an antenna port is determined based on below Table 1:

TABLE 1

| Antenna port p | [a b c d] |
|---|---|
| #7 | [+1 +1 +1 +1] |
| #8 | [+1 −1 +1 −1] |
| #11 | [+1 +1 −1 −1] |
| #13 | [+1 −1 −1 +1] |

* * * * *